United States Patent [19]

Schwartz

[11] Patent Number: 4,852,129
[45] Date of Patent: Jul. 25, 1989

[54] DATA COMPRESSION SYSTEM USING FREQUENCY BAND TRANSLATION AND INTERMEDIATE SAMPLE EXTRAPOLATION

[75] Inventor: Nira Schwartz, Doar Yehud, Israel

[73] Assignee: Niravoice Inc., Milpitas, Calif.

[21] Appl. No.: 888,453

[22] Filed: Jul. 21, 1986

Related U.S. Application Data

[63] Continuation-in-part of Ser. No. 755,375, Jul. 15, 1985, and Ser. No. 602,152, Apr. 19, 1984, which is a continuation-in-part of Ser. No. 484,268, Apr. 12, 1983, which is a continuation-in-part of Ser. No. 404,423, Aug. 2, 1982, abandoned, said Ser. No. 755,375, is a continuation-in-part of Ser. No. 404,423, Aug. 2, 1982, abandoned.

[30] Foreign Application Priority Data

Oct. 11, 1982 [IL] Israel ........................................ 66952
Jul. 17, 1983 [IL] Israel ........................................ 69251

[51] Int. Cl.$^4$ ........................... H04B 1/66; H04B 14/06
[52] U.S. Cl. .................................... 375/122; 375/27; 381/30; 381/31
[58] Field of Search ............ 375/25, 27, 34, 122; 370/79, 83, 84, 118, 11, 80; 381/29, 30, 31, 32; 382/56; 358/133, 135, 138, 260

[56] References Cited

U.S. PATENT DOCUMENTS

| | | | |
|---|---|---|---|
| 3,178,515 | 4/1965 | Bramer et al. | 370/11 |
| 3,325,601 | 6/1967 | Weber | 381/30 |
| 3,467,783 | 9/1969 | Magnuski | 381/30 |
| 3,715,512 | 2/1973 | Kelly | 381/30 |
| 3,716,789 | 2/1973 | Brown | 381/31 |
| 4,066,844 | 1/1978 | Ridings, Jr. et al. | 370/80 |
| 4,124,870 | 11/1978 | Schatz et al. | 382/56 |
| 4,270,025 | 5/1981 | Alsup et al. | 381/31 |
| 4,398,217 | 8/1983 | Peters | 382/56 |

Primary Examiner—Benedict V. Safourek
Attorney, Agent, or Firm—Cushman, Darby & Cushman

[57] ABSTRACT

A digital data transmission system for transmitting selected periodic ones of real data samples and intermediate extrapolated data samples. The transmitting end of the communication system includes means for sampling periodic ones of an information signal, an extrapolator for estimating intermediate samples between the selected periodic real samples, correction means for generating a correction value based upon the difference between extrapolated data and real data samples, and transmitting means that transmit periodic ones of real data samples and intermediate correction values. The receiving end includes means for receiving selected real digital data samples and the correction values, and a second extrapolator for estimating intermediate samples between the transmitted real data samples. The receiving end also includes correction means for reconstructing representations of the intermediate data samples computed at the transmitting end based upon the transmitted periodic real data sample and the transmitted correction value. Accordingly, the invention attains bit savings in the communication system. At the both the transmitting and receiving ends, intermediate extrapolated data samples are formed on plural frequency-translated subbands of the lower portion of the voice spectrum. Each low-frequency subband is used for producing the extrapolated value of the respective low-frequency subband. A composite extrapolated signal is formed by combining the results from each subband thereby to reconstruct the intermediate extrapolated sample. Tracking errors between the transmitting extrapolator and the receiving extrapolator are aligned by use of the correction values.

9 Claims, 14 Drawing Sheets

TRANSMITTING END

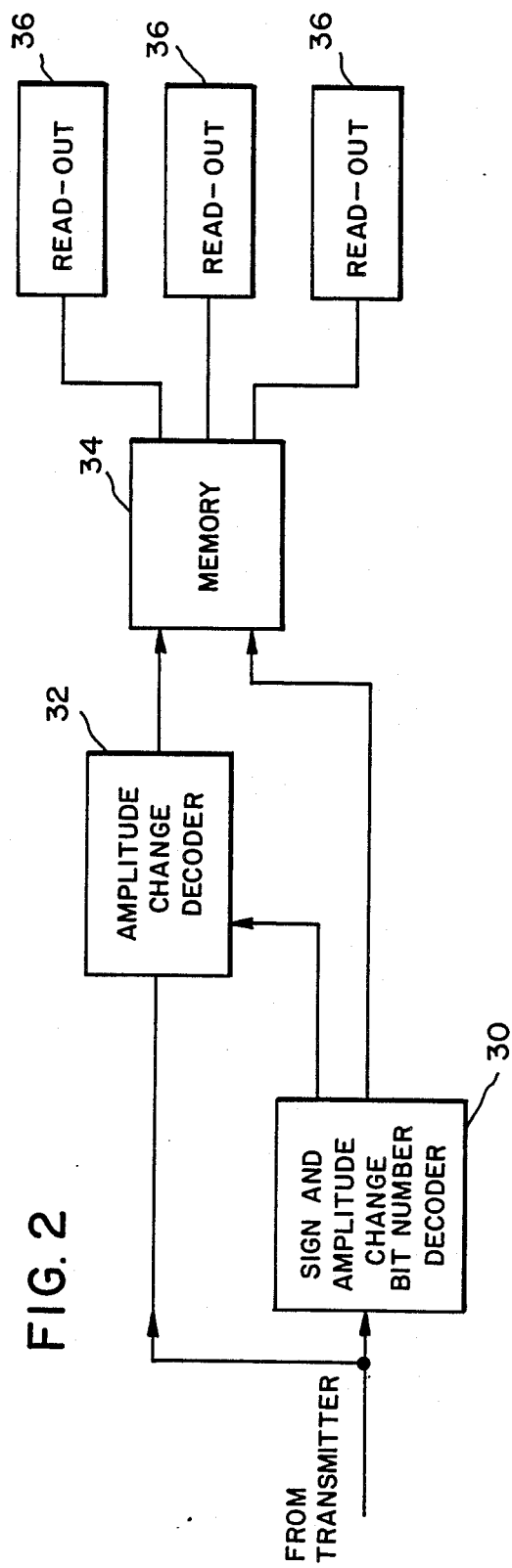

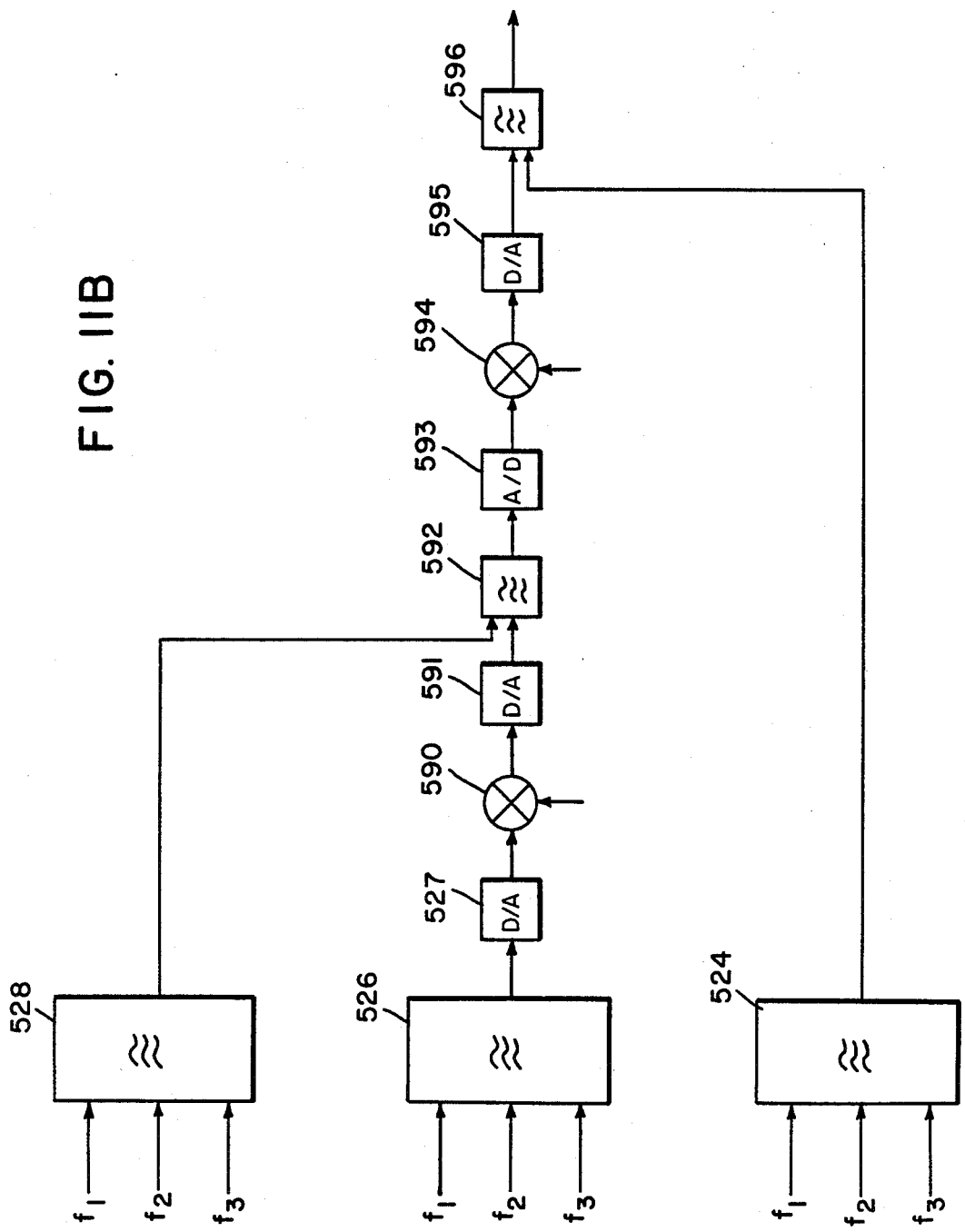
FIG. IIB

TABLE OF FIRST THRU NINTH ORDER CHANGES OF REAL DATA SAMPLES

| | AMP | D1 | D2 | D3 | D4 | D5 | D6 | D7 | D8 | D9 |
|---|---|---|---|---|---|---|---|---|---|---|
| 1 | 25. | 24.0 | 1.88 | 0.85 | 0.11 | 0.03 | 0.51E-02 | 0.90E-03 | 0.23E-03 | 0.26E-04 |
| 2 | 49. | 22.1 | 2.73 | 0.75 | 0.13 | 0.02 | 0.60E-02 | 0.67E-03 | 0.26E-03 | 0.16E-04 |
| 3 | 71. | 19.4 | 3.48 | 0.61 | 0.16 | 0.02 | 0.67E-02 | 0.44E-03 | 0.27E-03 | 0.54E-05 |
| 4 | 91. | 15.0 | 4.09 | -0.45 | 0.17 | 0.01 | -0.71E-02 | -0.14E-03 | 0.28E-03 | -0.54E-04 |
| 5 | 106. | 11.8 | 4.54 | -0.28 | 0.19 | 0.00 | -0.73E-02 | 0.14E-03 | 0.27E-03 | -0.16E-04 |
| 6 | 118. | 7.3 | 4.82 | -0.09 | 0.19 | -0.00 | -0.71E-02 | 0.41E-03 | 0.26E-03 | -0.26E-04 |
| 7 | 126. | 2.5 | 4.92 | 0.09 | 0.19 | -0.01 | -0.67E-02 | 0.67E-03 | 0.23E-03 | -0.35E-04 |
| 8 | 128. | -2.5 | 4.82 | 0.28 | 0.17 | -0.02 | -0.60E-02 | 0.90E-03 | 0.20E-03 | -0.42E-04 |
| 9 | 126. | -7.3 | 4.54 | 0.45 | 0.16 | -0.02 | -0.51E-02 | 0.11E-02 | 0.16E-03 | -0.48E-04 |
| 10 | 118. | -11.8 | 4.09 | 0.61 | 0.13 | -0.03 | -0.40E-02 | 0.13E-02 | 0.11E-03 | -0.52E-04 |
| 11 | 106. | -15.9 | 3.48 | 0.75 | 0.11 | -0.03 | -0.28E-02 | 0.14E-02 | 0.54E-04 | -0.54E-04 |
| 12 | 91. | -19.4 | 2.73 | 0.85 | 0.07 | -0.04 | -0.14E-02 | 0.14E-02 | 0.18E-09 | -0.54E-04 |
| 13 | 71. | -22.1 | 1.38 | 0.92 | 0.04 | -0.04 | -0.46E-08 | 0.14E-02 | -0.54E-04 | -0.52E-04 |
| 14 | 49. | -24.0 | 0.96 | 0.96 | 0.00 | -0.04 | 0.14E-02 | 0.14E-02 | -0.11E-03 | -0.48E-04 |
| 15 | 25. | -25.0 | -0.00 | 0.96 | 0.04 | -0.04 | 0.28E-02 | 0.13E-02 | -0.16E-03 | -0.42E-04 |
| 16 | 0. | -25.0 | 0.96 | 0.92 | -0.07 | -0.03 | 0.40E-02 | 0.11E-02 | -0.20E-03 | -0.35E-04 |
| 17 | -25. | -24.0 | 1.88 | 0.85 | -0.11 | -0.03 | 0.51E-02 | 0.90E-03 | -0.23E-03 | -0.26E-04 |
| 18 | -49. | -22.1 | 2.73 | 0.75 | -0.13 | -0.02 | 0.60E-02 | 0.67E-03 | -0.26E-03 | -0.16E-04 |
| 19 | -71. | -19.4 | 3.48 | 0.61 | -0.16 | -0.02 | 0.67E-02 | 0.41E-03 | -0.27E-03 | 0.34E-05 |
| 20 | -91. | -15.9 | 4.09 | 0.45 | 0.17 | 0.01 | 0.71E-02 | 0.14E-03 | 0.28E-03 | 0.54E-05 |

FIG. 12A

TABLE OF FIRST THRU NINTH ORDER CHANGES OF EXTRAPOLATED DATA SAMPLES

| | AMP | D1 | D2 | D3 | D4 | D5 | D6 | D7 | D8 | D9 |
|---|---|---|---|---|---|---|---|---|---|---|
| 1 | 25. | 24.0 | 1.88 | 0.85 | 0.11 | 0.03 | 0.51E-02 | 0.90E-03 | 0.23E-03 | 0.0 |
| 2 | 49. | 22.1 | 2.73 | 0.75 | 0.13 | 0.02 | 0.60E-02 | 0.67E-03 | 0.23E-03 | 0.0 |
| 3 | 71. | 19.4 | -3.48 | -0.61 | 0.16 | 0.02 | 0.67E-02 | 0.44E-03 | 0.23E-03 | 0.0 |
| 4 | 91. | 15.0 | -4.09 | -0.45 | 0.17 | 0.01 | -0.72E-03 | -0.21E-03 | 0.23E-03 | 0.0 |
| 5 | 106. | 11.8 | -4.54 | -0.28 | 0.19 | 0.00 | -0.74E-02 | 0.25E-04 | 0.23E-03 | 0.0 |
| 6 | 118. | 7.3 | -4.82 | -0.09 | 0.19 | -0.00 | -0.73E-02 | 0.26E-03 | 0.23E-03 | 0.0 |
| 7 | 126. | 2.5 | -4.92 | 0.09 | 0.19 | -0.01 | 0.71E-02 | 0.49E-03 | 0.23E-03 | 0.0 |
| 8 | 128. | -2.5 | -4.82 | 0.28 | 0.17 | -0.02 | 0.66E-02 | 0.72E-03 | 0.23E-03 | 0.0 |
| 9 | 126. | -7.3 | -4.54 | 0.45 | 0.16 | -0.02 | 0.59E-02 | 0.95E-02 | 0.23E-03 | 0.0 |
| 10 | 118. | -11.8 | -4.09 | 0.61 | 0.13 | -0.03 | -0.49E-02 | 0.12E-02 | 0.23E-03 | 0.0 |
| 11 | 106. | -15.9 | -3.48 | 0.74 | 0.10 | -0.04 | -0.37E-02 | 0.14E-02 | 0.23E-04 | 0.0 |
| 12 | 91. | -19.4 | -2.74 | 0.84 | 0.07 | -0.04 | -0.23E-02 | 0.16E-02 | 0.23E-09 | 0.0 |
| 13 | 71. | -22.1 | -1.90 | 0.91 | 0.03 | -0.04 | -0.66E-08 | 0.19E-02 | 0.23E-04 | 0.0 |
| 14 | 49. | -24.8 | -0.99 | 0.93 | 0.02 | -0.04 | 0.12E-02 | 0.21E-02 | -0.23E-03 | 0.0 |
| 15 | 25. | -25.0 | -0.06 | 0.92 | -0.06 | -0.04 | 0.13E-02 | 0.23E-02 | -0.23E-03 | 0.0 |
| 16 | 0. | -25.0 | 0.86 | 0.86 | -0.10 | -0.04 | 0.57E-02 | 0.26E-02 | -0.23E-03 | 0.0 |
| 17 | -25. | -24.0 | 1.72 | 0.76 | -0.14 | -0.03 | 0.83E-02 | 0.28E-02 | -0.23E-03 | 0.0 |
| 18 | -49. | -22.1 | 2.48 | 0.62 | -0.17 | -0.02 | 0.11E-02 | 0.30E-02 | -0.23E-03 | 0.0 |
| 19 | -72. | | | | | | | | | |

FIG. 12B

DATA COMPRESSION SYSTEM USING FREQUENCY BAND TRANSLATION AND INTERMEDIATE SAMPLE EXTRAPOLATION

REFERENCE TO CO-PENDING APPLICATIONS

This application is a continuation-in-part of two U.S. patent applications, the first Ser. No. 602,152, filed Apr. 19, 1984 (which was a continuation-in-part of Ser. No. 484,268, filed Apr. 12, 1983, which was in turn a continuation-in-part of Ser. No. 404,423, filed Aug. 2, 1982) now abandoned, and the second Ser. No. 755,375, filed July 15, 1985 (which was also a continuation-in-part of listed Ser. No. 404,423, now abandoned).

FIELD OF THE INVENTION

The present invention relates to data communications systems and more particularly to bit saving techniques for transmission of voice data along a digital communications link.

BACKGROUND OF THE INVENTION

It is well known to transmit digital representations of a multiplicity of conversations along a single transmission link by periodic sampling of an analog signal, such as a voice signal, and transmitting discrete digital samples in place of analog signals. The Nyquist sampling theorem fixes the minimum sampling rate as twice the highest frequency of the signal sampled analog.

One widely used technique for digital is PCM, i.e. pulse code modulation, whereby each sample is expressed in an 8 bit code. Various other types of coding for digital information transmission are also known and used. Most conventional digital transmission techniques are characterized in that only a single sample relating to a single conversation is transmitted at a given time. Therefore, using conventional technology, one can transmit 30 voice and 2 signaling channels over a single communications link.

There is described and claimed in applicant's Israel patent application 63117, which issued Dec. 20, 1984, an apparatus and method for transmitting digital information by encoding a plurality of signals coded into a multiplicity of digital code elements in accordance with a first modulation technique; and for generating and transmitting coded addresses, each encoded address represents a digital code in accordance with a second modulation technique corresponding to a combination of code elements of individual ones of the plurality of signals.

The present invention seeks to provide a method and apparatus for transmitting of voice signals which enables maximum benefit to be obtained from the technique of the aforesaid issued Israel patent application 63117. The technique and apparatus of the present invention is also applicable to transmission techniques other than that described in the aforesaid issued Isrel patent application 63117.

SUMMARY OF THE INVENTION

The present invention seeks to provide a technique for transmission of voice communications which greatly enhances the efficiency of such transmissions and enables a significantly greater number of conversations to be transmitted over the same number of transmission channels than heretofore.

There is thus provided in accordance with an embodiment of the present invention a technique for transmitting analog signals comprising the steps of sampling the analog signal at a given sampling rate provide a digital representation of the amplitude thereof, storing the sampled amplitude at a time t, and thereafter at time T+nt transmitting only the changes in amplitude, while updating the stored amplitude accordingly.

In a first aspect of the invention, a plurality of analog signals are sampled and digital representations thereof are provided, their respective amplitudes are stored, and the changes in their amplitudes at subsequent sampling times are transmitted.

In another of the present invention, the change in amplitude of one or more analog signals is carried by a first code indicating whether there is an amplitude change and what its sense is, i.e. positive or negative, and indicating the number of bits to be used to define the amplitude change; and a second code of bit content which varies corresponding to the size of the amplitude change of the amplitude signal.

In a further aspect of the invention, a plurality of analog signals may be transmitted by multiplexed first codes which indicate the sense, change status and number of bits for the respective signals and by second codes which contain the definition of the amplitude change for each of the plurality of signals.

In yet another aspect of the invention, an additional bit is provided to indicate an amplitude change which exceeds a predetermined limit representing the bit permutation of the first code and which effects transmission of the entire bit stream for full definition of the amplitude change.

The present invention is predicted on a characteristic particularly in voice signals that, most of the energy of voice activity is in the frequency range of approximately 100–600 Hz. Thus with a sampling rate of 8000 Hz, which is conventional in digital telephone communications, it is seen that most of the amplitude changes are sufficiently small and can be quantized by much less than the conventional 8-bit 256 level full bit stream definition. Accordingly a plurality of voice signals may be transmitted whereby unneeded bits from the transmission of a first signal may be added to the bit stream of a relatively large amplitude signal transmission which such bits are required for full and accurate definition. Moreover, the absolute amplitude rather than the amplitude change may be transmitted via the second code. Digital signals, as well as analog signals, may be transmitted by the above-described technique.

In addition to or instead of transmitting the change in amplitude A of a signal, e.g. the first derivative, the second or third, etc. derivative may be transmitted for further bit savings. In such cases, not only the amplitude, but also the change in the amplitude, and the change in the change in the amplitude, etc. as appropriate must be stored in a memory.

Further in accordance with an embodiment of the present invention, there is provided apparatus for transmitting analog information comprising amplitude sampling means for successively sampling the amplitude of at least one analog signal to form digital samples representative thereof, means for determining the current value of the zero through nth order change of a current sample of the signal(s) relative to a predetermined reference function, memory means for storing a determined current value, comparator means receiving inputs from the sampling means and from the memory means and extrapolating therefrom for providing an output indication of the (n+1)th order change in the amplitude of the data sample relative to said predetermined reference function, first coding means operative to receive an output from the comparator means and for providing a first coded message indicating the sign characteristic of the (n+1)th order change and second coding means operative to receive an output from the comparator means and for providing a second coded message indicating the size of the (n+1)th order change for the at least one signal wherein n is a selected integer.

The predetermined reference function may represent the preceding sampling and the at least one signal may comprise an analog signal or a digital signal.

There is also provided a method for transmitting digital information comprising the steps of successively sampling an analog signal to form digital samples representing of the amplitude thereof, determining the current value of an nth order amplified change of successive samples relative to a predetermined reference function, storing the determined amplitude changes, comparing a sampled amplitude with a stored determined value and extrapolating therefrom to provide an output indication of the (n+1)th order amplitude change relative to said predetermined reference function, providing a first coded message indicating the sign characteristic of the (n+1)th order change and providing a second coded message indicating the size of the (n+1)th order change for the at least one signal wherei n is a selected integer.

The predetermined reference function may represent the preceding sampling and the at least one signal may start as a digital signal.

Possible difficulties occur when the frequency of the signal being sampled has a relatively high frequency, near the sampling rate of the amplitude sampling means. This is due to large changes in the signal between adjacent sample points and thus sampling is not representative of the overall signal characteristics. The present invention, as will become evident, overcomes this difficulty.

Preferably the apparatus comprises:

sampling means for sampling a signal and providing a digital representation thereof;

a transmitter for transmitting information indicating the value of every (n+1)th sample of a signal, wherein n is a selected integer;

a receiving for receiving the information indicating the value of every (n+1)th sample of the signal and for reconstructing the signal therefrom, the receiver including a frequency translator for converting predetermined high frequency portions of every (n+1)th sample of the signal to lower frequency bands;

an extrapolator for extrapolating intermediate samples following conversion of each (n+1)th sample; and a second frequency translator for recovering the high frequency portion and each circuit for converting extrapolator (n+1)th sample and the intermediate samples.

A more specific embodiment includes means in the transmitter to transmit corrections to the extrapolated signals, as necessary, where the extrapolator also responds to such received corrections.

The extrapolator comprises:

a memory for storing the current value of the nth order amplitude changes of the signal to a predetermined reference function; and a comparator receiving the transmitted information, transmitted corrections, and inputs from the memory apparatus for extrapolating intermediate samples.

Additionally the correction transmission means comprises:

amplitude sampling means for sampling the amplitude of the signal, a memory for storing the current value of the zero through nth order amplitude changes of the signal relative to a predetermined reference function, a comparator receiving inputs from the sampling apparatus and from the memory for providing an output indication of deviations of the zero through nth order change in the sampled signal from that stored in the memory apparatus; and means for transmitting a correction to reflect the deviation.

In a preferred embodiment of the invention the memory apparatus of both the transmission apparatus and the receiving apparatus are maintained to have identical contents, the memory apparatus of the receiving apparatus being updated by the corrections.

In yet another embodiment, of the invention further includes means for sampling the amplitude of the signal to provide a digital signal representative thereof, a frequency translator for converting predetermined high-frequency portions of the signal to lower-frequency bands, control means for determining the current value of the zero through nth order amplitude change of the frequency-translated signal relative to a predetermined reference function, a memory for storing computed change data, a comparator receiving inputs from the converting apparatus and from the memory apparatus for providing an output indication of the (n+1)th order amplitude change relative to the predetermined reference function, first coding means receiving comparator output and for providing a first coded message indicating the sign characteristic of the (n+1)th order change, second coding apparatus the comparator output and for providing a second coded message indicating the size of the (n+1)th order amplitude change, and means for the signal from the first and second coded messages and the contents of the memory means including its high frequency portions.

Due to the nature of human vocal cords, the frequency of human speech always remains constant for at least 20 milliseconds, which allows 160 samples at a sampling rate of 8 kHz. Therefore, it is considered reasonable to assume constancy of the speech waveform over a number of samples, such as 5 or 10 samples.

The frequency converter for converting high frequency portions of the signal to lower frequency form comprises a first mixer for combining a predetermined high frequency portion of the signal with a first reference signal and producing a first relatively high frequency output and a first relatively low frequency output, a first filter for isolating the first relatively low frequency output, and nth mixer apparatus for combing the (n−1)th relatively high frequency output with an nth reference signal, and for producing an nth relatively high frequency outputs and an nth relatively low frequency output, where n is a series of at least one integer beginning with 2.

Further in accordance with an embodiment of the present invention, there is provided a technique for the transmission of communication comprising the steps of sampling the amplitude of at least one signal and providing a digital representation thereof; frequency translating certain high frequency portions thereof to lower frequency bands; determining and storing the current value of the zero through nth order amplitude changes of the frequency translated signal relative to a predetermined reference function; comparing the amplitude changes with stored values and providing an output indication of the (n+1)th order amplitude changes relative to the predetermined reference function; providing a first coded message indicating the sign characteristic of the (n+1)th order amplitude change; providing a second coded message indicating the size of the (n+1)th order change wherein n is a selected integer; and reconstructing the signal including the high frequency portion from the first and second coded messages and the contents of the memory. The frequency-translating step includes combining a second predetermined high-frequency portion of the signal with a first reference signal and producing a first relatively high-frequency output and a first relatively low-frequency output, isolating the first relatively low-frequency output, and combining the (n−1)th relatively high-frequency output with an nth reference signal and producing an nth relatively high-frequency output and an nth relatively low-frequency output, where n is a series of at least one integer beginning with 2.

BRIEF DESCRIPTION OF THE DRAWINGS

The present invention will be more fully understood and appreciated from the followed detailed description taken in conjunction with the drawings in which:

FIG. 2 is a block diagram illustration of receiving apparatus constructed and operative in accordance with an embodiment of the present invention in conjunction with the apparatus of FIG. 1;

FIG. 3 is a code diagram useful in the invention;

FIG. 11A and 11B are block diagrams illustrations of the frequency reconstruction circuitry of the communications system of FIGS. 9A and 9B.

FIGS. 12A and 12B are tables respectively representing zero through ninth order derivatives of real data samples and extrapolated data samples for an exemplary 250 Hz sine wave component of speech which is useful for explaining the theory behind the invention.

DETAILED DESCRIPTION OF THE INVENTION

I. Theory of Operation

The present invention is predicted on the appreciation that in voice communication, most of the activity, i.e., the voice energy is transmitted within a wavelength range of between approximately 100 and 600 Hz. In mathematical terms one can say that if one expresses normal voice analog signals as a Fourier series An*sin (n)t+Bn*cos (n)t, the integrals of An and Bn over the frequency range 100–600 Hz provides approximately 80% of the value of the integrals over all frequencies.

If one employs a conventional sampling rate of 8000 Hz used in the telephone industry, it may be appreciated that except for very sharp amplitude changes which are quite rare, most amplitude changes between adjacent samples are sufficiently small as to be defined sufficiently accuractely with less than the 8 bits normally used for a full scale 256 level definition of the signal. In accordance with the invention, significant bit efficiency and savings in transmission are realized by classifying the amplitude change as to its general characteristics and then transmitting a relatively short bit stream further defining the amplitude change.

Figure 1:
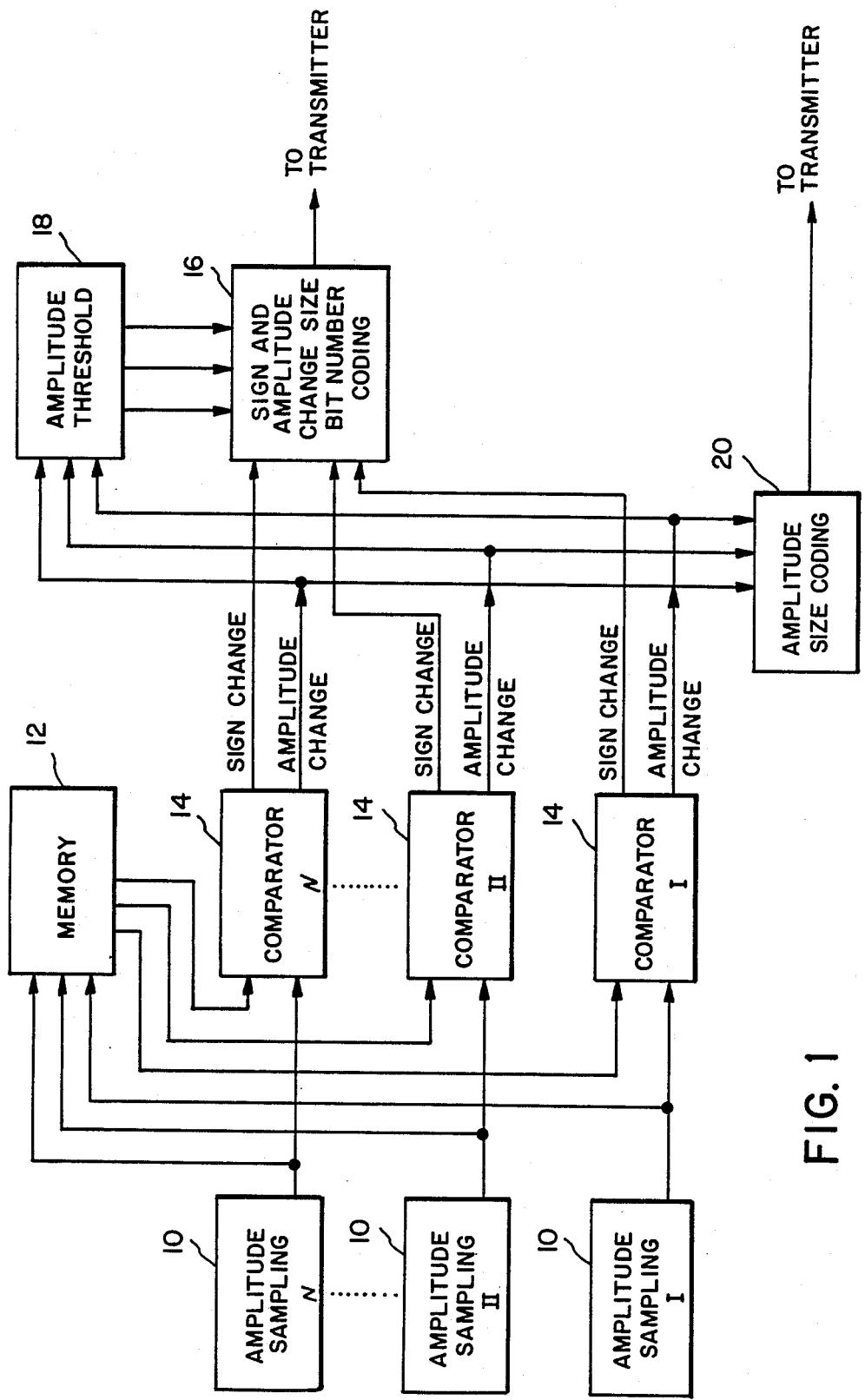
FIG. 1 is a block diagram illustration of transmission apparatus constructed and operative in accordance with an embodiment of the present invention.

Reference is now made to FIG. 1 which is a block diagram of an apparatus for transmitting a plurality of analog signals in digital form. The apparatus comprises a plurality of amplitude sampling circuits 10 each of which contains an A/D converter for sampling respective analog signals at a predetermined sampling rate, typically 8000 Hz. Any desired number of sampling circuits 10 may be employed although only three are shown. The digital outputs of each of the sampling circuits 10 are supplied to a memory 12, which stores digital data representing the current amplitude level of each analog signal. The outputs of each sampling circuit are also supplied to a plurality of corresponding comparators 14, each of which also receives an input from memory 12 in order to make a comparison. Comparators 14 provide two outputs, indicating respectively, the sense of the change in amplitude of the sampled analog signal from the previous sample (hereof the "sense"- positive, negative, zero) and the size of this change.

The "sense" output of comparator 14 is supplied to sign and amplitude change bit number coding circuitry 16, and the "size" output is supplied in parallel to amplitude threshold circuitry 18 and to amplitude size coding circuitry 20.

The amplitude threshold circuitry 18 classifies the "size" data into a number of predetermined groups which may be adequately described by respective numbers of bits. Circuitry 18 provides an output to the sign and amplitude change bit number coding circuitry 16 which indicates the classification group to which the "size" data belongs. As indicated by the double arrow heads between them, threshold circuitry 18 also provides an information to size coding circuitry 20, which in turn, provides a bit stream of variable length characterizing the "size" data for each sampled analog signal.

Circuitry 16 provides a coded output indicating both the sign and size data bit lengths e.g., the maximum number of bits required for description of the size of the amplitude changes. The output of circuitry 16 is supplied together with the output of circuitry 20 to a transmitter containing a conventional multiplexer circuitry for multiplexing a plurality of signals.

The outputs of circuitry 16 and of circuitry 20 may be transmitted by any desired technique. According to a prefer embodiment of the present invention, they are transmitted by different modulation techniques over the same frequency band. Thus for example, the output of circuitry 16 may be transmitted by PCM, while the output of circuitry 20 may be transmitted by AM, FM or any other desired type of modulation. This technique is described and claimed in applicant's issued Israel Patent 63117.

II. Sign and Bit Length Classification

The operation of circuitry 16 will now be explained with reference to FIG. 3, which is a table indicating a typical type of coding useful for clarifying three signals.

A set of five groups defines various conditions of respective changes in the sign of different signals:

| GROUP | DESCRIPTION |
| --- | --- |
| I | NO SIGN CHANGE IN ANY OF THE THREE SIGNALS |
| II | SIGN CHANGE IN FIRST SIGNAL ONLY |
| III | SIGN CHANGE IN SECOND SIGNAL ONLY |
| IV | SIGN CHANGE IN THIRD SIGNAL ONLY |
| V | SIGN CHANGE IN MORE THAN ONE SIGNAL |

For the sake of clarity it is noted that the sign changes being considered are the change insign of the amplitude change as compared with the amplitude change noted in the previous example. It is also noted that notwithstanding that group V contains many more permutations than the other groups I-IV, which are single permutation groups, group V has a probability of occurrence which is lower than the remaining groups.

The output from circuitry 18 indicates the size data bit length classification as follows:

| CLASSI-FICATION | DESCRIPTION |
| --- | --- |
| A | AMPLITUDE CHANGE CAN BE DESCRIBED BY 2 BIT PER SIGNAL |
| B | AMPLITUDE CHANGE CAN BE DESCRIBED BY 3 BITS PER SIGNAL |
| C | AMPLITUDE CHANGE CAN BE DESCRIBED BY 4 BITS PER SIGNAL |

FIG. 3 shows permutations arising from the combination of the five groups I-V and the three classifications. It is seen that 15 permutations, numbered 1-15 result. A sixteenth permutation indicates that the amplitude change is of amplitude so great that it cannot be described by four bits.

It follows that, to define all sixteen conditions, circuitry transmits a four-bit nibble indicating a unique one of the conditions at the receiving end. As noted above, for the permutations 1-5, 2 bits will be used for each of the signals, for the permutations 6-10, 3 bits will be used for each of the signals and for the permutations 11-15, thus 4 bits will be used for each of the signals. It is further noted that for the permutation 16, a greater number of bits may be used as desired. For the permutations of classification V where more than one signal experienced a sign change, i.e., permutations 5, 10 and 15, an additional two bits are added to identify which of the these signals are involved.

It is a particular feature of the present invention that the Group I-IV conditions in classification A have a higher probability. On the basis of the available information, the probability of occurrence for the various conditions is as follows for human speech data:

| CONDITION NO. | PROBABILITY |
| --- | --- |
| 1, 2, 3, 4 | 95% |
| 6, 7, 8, 9 | |
| 11, 12, 13, 14 | |
| 5, 10, 15 | 4% |
| 16 | 1% |

According to an alternative embodiment of the present invention, absolute amplitudes may be transmitted instead of amplitude changes. It is also appreciated that digital signals may also be sampled and transmitted in accordance with the present invention by suitable techniques corresponding to the techniques described hereinabove.

III. Decoding at Receiving End

Reference is now made to FIG. 2 which is a block diagram of receiving circuitry constructed and operative in accordance with an embodiment of the present invention and designed to work together with the transmitting circuitry of FIG. 1.

Digital signals received over a transmission link from a transmitter are supplied in parallel to a sign and amplitude change bit number decoder 30 and to an amplitude change decoder 32. Decoder 30 decodes the 4-bit code nibble on the communication link. After decoding one of the sixteen conditions, decoder 30 supplies memory 34 with the sign change data for each signal and supplies decoder 32 with bit length information required to define the amplitude change. The bit length enables decoder 32, to determine which bits in a continuous bit stream for the transmitter represent the size of the amplitude change for each of the signals. The amplitude change decoder 32 then segments the data stream and provides an output to memory 34 indicating the amplitude change for each of the signals.

Memory 34 stores the current amplitude for each of the channels. The contents of the memory are read out as desired by read out circuits 36 corresponding to each analog signal which includes conventional processing circuitry to reconstruct the analog signals to a desired level of accuracy biased upon the stored data. As an example, APCM systems use amplitude change data to reconstruct the original data signal.

It may be appreciated by persons skilled in the art that significant bit savings are provided by the apparatus and technique of the present invention. If one compares the operation of the present invention with conventional transmission techniques wherein 8 bits are employed to describe data samples for each of the three signals, e.g. 24-bits, bit savings occur as follows:

| CONDITION | | BITS REQUIRED | BITS SAVED |
| --- | --- | --- | --- |
| 1 | | 10 | 14 |
| 2 | 4 bits + 6 | 10 | 14 |
| 3 | bits/channel | 10 | 14 |
| 4 | | 10 | 14 |
| 5 | + extra sign bit | 12 | 12 |

| | CONDITION | BITS REQUIRED | BITS SAVED |
|---|---|---|---|
| | -continued | | |
| 6 | | 13 | 11 |
| 7 | 4 bits + 3 | 13 | 11 |
| 8 | bits/channel | 13 | 11 |
| 9 | | 13 | 11 |
| 10 | + extra sign bit | 15 | 9 |
| 11 | | 16 | 8 |
| 12 | 4 bits + 4 | 16 | 8 |
| 13 | bits/channel | 16 | 8 |
| 14 | | 16 | 8 |
| 15 | + extra sign bit | 18 | 6 |
| 16 | | up to 24 | down to 0 |

In view of the probabilities of the FIG. 3 conditions set forth savings of between 40 and 50% in bit transmission may be obtained with very little information loss.

It is further appreciated that any other type of code or organization configuration may be used in accordance with the present invention. A greater or lesser amount of signals may be handled by the apparatus. The coding may employ a greater or lesser numberr of groups or combinations so as to obtain maximum bit savings. Thus, for example, a larger number of groups may be employed so as to enable a specific group to be assigned for indicating the number of bits to be used for each individual signal, instead of for each group of signals. That is, instead of assigning a classification A to the condition where amplitude changes are described by 2 bits, one can instead assign classifications as follows:

| CLASSI-FICATION | DESCRIPTION |
|---|---|
| A 1 | AMPLITUDE CHANGE FOR FIRST SIGNAL CAN BE DESCRIBED BY 2 BITS |
| A 2 | AMPLITUDE CHANGE FOR SECOND SIGNAL CAN BE DESCRIBED BY 2 BITS |
| A 3 | AMPLITUDE CHANGE FOR THIRD SIGNAL CAN BE DESCRIBED BY 2 BITS |

A similar definition can be done for the remaining classification. The foregoing is one of many possible examples of redefinition of the coding format according to the invention for obtaining maximized bit efficiency. The present invention is not limited to any code or organizational format.

The following discussion relates to FIGS. 4-8 and describes a coding format technique for use with the various embodiments of the invention, although it makes particular reference to the embodiment above described in connection with FIGS. 1-3.

References will now be made to the following References:
(1) TMS 32010 User Guide, Digital Signal Processor Products: Texas Instruments
(2) TMS 32010 Analog Interface Board, Digital Signal Processor Product: Texas Instruments
(3) Z80 SoftwareGourmet Guide & Cookbook. Nat Wadsworth: Hayden Book Company, Inc.
(4) The Z-80 Microcomputer Handbook. William Barden, Jr.: Howard W. Sams & Co., Inc.

Figure 4:
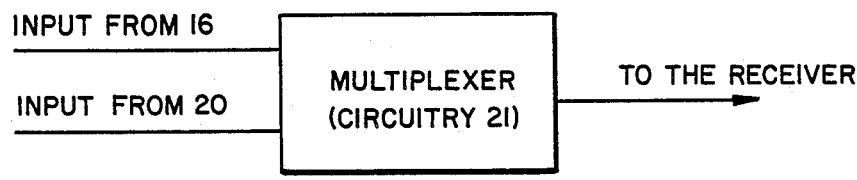
FIG. 4 is a block diagram of a multiplexer operative with the transmission apparatus of FIG. 1.

Reference is made to FIGS. 1 and 4. The output of circuitry 20 and 16 in FIG. 1 is inputted to circuitry 21 in FIG. 4, which is the multiplexer. Each of circuits 10 includes an A/D converter. Such a converter is well known in the art (e.g., Reference 2, Appendix A, sheet 1 of 3, No. AD/ADC88). The general specification is on pages 1-4:
  Resolution = 12 bits
  Conversion time = 25 microseconds
For example, if the sampling frequency is 8 KHz, i.e., 125 microseconds between sampling points, there remain 125−25=100 microseconds for processing of the software routines which the circuitries are composed of. If 256 quantization levels are used for the amplitude, and the A/D is as above, only the 8 MSB of the 12 resolution bits can be used to express tha amplitude values.

Any circuitry can be described by a software routine, a fact that is well known in the art (References 3 and 4), and the specific combinations of such routines form the logic of the idea upon which this application is based. Routines store their results in named memory locations (i.e., addresses which have names). Such results are accessible to any other routine in the progrm, at any time. FIG. 1 is not a hardware sketch, but rather a flow chart whose purpose is to clarify the general idea of this application.

The output of each of the sampling A/D circuits 10 is supplied to memory 12, which is operative to store the current amplitude level of each analog signal. Each channel has its own microprocessor for inputting and processing its own routines. Each channel puts its data in memory 12 at a specific memory location. Each channel has its own memory, or, if DMA is being used, all channels can use the same memory.

The routine known in the art for inputting from A/D to a specific location in memory is given in Reference 3, chapter 4, page 150, and the flow chart is given on page 151. The name of the routine is INTIP:. This routine may be rewritten by eliminating code which is superfluous for the following reasons.

The routine inputs a character from an input device, at port 01H. it is not necessary to store values within Registers AF, HL and IX there, because it is not necessary to PUSH them, as is done in the routine. The only purpose of this routine is to input sampling values. Other inputs are not expected, therefore no "in-progress flag" is needed which might protect such cases, and, since one sampling point is inputted at a time, a data character counter is also superfluous. Also, it is unnecessary to check for a carriage return character, since such is not expected. FLGIN+1 indicates a pointer to the memory location in which the last character was inputted. The new character is inputted at memory location (FLGIN+1) +1. If the superfluous code is eliminated and the routine renamed, the result is:

| INTIP:1 | |
|---|---|
| IN A, 01H | Input character from input device |
| LD IX,(FLGIN+1) | Buffer pointer into index register |
| INC IX | Buffer pointer to next location |
| LD (IX+00H),A | Store pointer character in buffer |
| LD (FLGIN+1),IX | Restore updated buffer pointer to memory |
| RET | |

Figure 5:
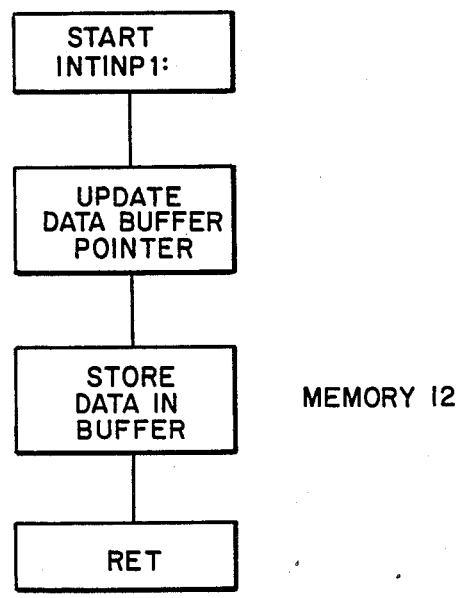
FIG. 5 is an illustration of the memory portion of the transmission apparatus of FIG. 1.

The flow chart now becomes much simpler, as shown in FIG. 5.

Since the input channels are in parallel (in the above example, three in parallel), and since each channel uses its own processor, the time needed for inputting data to memory 12, for all channels, is the same time needed for one channel.

The routine in References 3 and 4 is written in the Z-80 language. The clock for this chip is 5 MHz. There exists a different chip, TMS320-10, whose clock is 20 MHz, and a new version thereof is about to enter the market, with a 25 MHz clock. Specification is given to References 1 and 2, pages 1-2. The TMS320-10 instruction cycle is 160 nanoseconds. Pages 3-5, 3-6, and 3-7 indicate that the instructions set consists primarily of single-cycle-words. Only infrequently used branch and I/O instructions have two or three cycles.

Rewriting routine INTIP1: in TMS320 language, preserving the logic of the original routine, would take 10 instructions cycles, corresponding to a processing time of 2.0 microseconds.

The last inputted amplitude sample was stored at memory location (FLGIN+1). This amplitude sampling value is the input to the comparator 14 (Reference 3, chapter 7, page 216) named SGSUB:. This input value is 8 bits, which can be split into two bytes of 8 bits each. The first byte, ONE, is the absolute amplitude value composed of the 7 LSB, and its MSB is zero. The second byte, SIGN1, has an MSB of zero if the real amplitude sign is negative and one if the sign of the real amplitude is positive. A real 8 bit amplitude is positive if its MSB is one. For example, if the real amplitude value stored at memory 12 at time T is 11100011, then the value of ONE is 01100011, and the value of SIGN 1 is 10000000. The absolute value and sign of the previous sampling amplitude value at T-DT are stored as TWO and SIGN2 respectively.

The signed substraction routine stored at label SGSUB: subtracts the contents of table TWO from the contents of table ONE. The absolute change (ONE-TWO) is stored by overriding the memory location at TWO. The sign of that change is stored at address SIGN2.

The calling program must set the contents of table ONE and SIGN1 (the absolute value and sign of the sampled amplitude at sample time T), and of table TWO and SIGN2 (the absolute value and sign of the sampled amplitude at the previous sampled time T-DT) to the proper values before calling SGSUB:. This is done via the following routine which loads memory locations ONE and SIGN 1:

| PARAMETERS1: | |
|---|---|
| LD IX, (FLGIN+1) | Restore updated buffer pointer |
| LD A,(IX) | Store real amplitude |
| AND 01111111 | Take absolute amplitude |
| LD (ONE),A | Load into ONE |
| LD A,(IX) | Preparations to take sign |
| AND 10000000 | Take sign |
| LD (SIGN1),A | Load sign value |
| RET | |

The TMS302-10 would perform this logic in 10 instruction cycles, which would take 2 microseconds. The loading of memory locations TWO and SIGN2 is achieved by the following routine:

| PARAMETERS1: | |
|---|---|
| LD HL, (FLGIN+1) | Restore updated buffer pointer |
| DEC HL | Put in memory of previous amplitude |
| LD A,(HL) | Store real amplitude |
| AND 01111111 | Take absolute amplitude |
| LD (TWO) | Load into ONE |
| LD A,(HL) | Preparations to take sign |
| AND 10000000 | Take sign |
| LD (SIGN2),A | Load sign value |
| RET | |

The TMS320-10 would perform this logic in logic in 11 instruction cycles, which would take 2.2 microseconds. Now the SGSUB can be processed. Its code is:

| SGSUB: | |
|---|---|
| LD HL,SIGN1 | Set pointer to SIGN1 |
| LD A,(SIGN2) | Fetch SIGN2 into accumulator |
| CP (HL) | See if signs are identical |
| JP NZ,DIFSGN | If not, process different signs |
| AND A | If so, see if both are positive |
| JP M,NEG | If not, process as negative |
| CALL CMPR12 | See if ONE is greater than TWO |
| JP NC,B21 | If so, subtract TWO from ONE |
| LD A,80H | If not, set sign of TWO NEGATIVE |
| LD (SIGN2),A | Put negative indicator into SIGN2 |
| JP SB12 | Go substract ONE from TWO |
| DIFSGN: | |
| LD A,(SIGN2) | Fetch SIGN2 into accumulator |
| ADD A,80H | Change sign to opposite state |
| LD (SIGN2),A | Restore new sign to memory |
| JP SAR2 | Go add ONE to TWO |
| NEG: | |
| CALL CMPR12 | Is ONE greater than TWO? |
| JP NZ,NEG1 | If equal, result is zero |
| JP NZ,SB21 | If smaller, substract TWO from ONE |
| NEG1: | |
| XOR A | If greater, substract ONE from TWO |
| LD (SIGN2),A | Set SIGN2 positive |
| JP SB12 | Go substract ONE from TWO |

The result is stored as two bytes (8 bits each) of output. The value is stored at memory location TWO, now indicating the ABS (absolute) change of amplitude, and the sign of the amplitude change is stored at memory location SIGN2. This SIGN2 result is also stored at memory SIGN3, so as to check whether there was a change in the sign of the difference. This is done because the sign of the ABS amplitude difference changes only twice during a full cycle, or an average of 10% of all sampling points. Therefore, only the change of sign is transmitted and not the sign itself. At power up, SIGN3 is loaded with zero. This is done via the routine CMPSG23:

| CMPSG23: | |
|---|---|
| LD A, (SIGN2) | Load sign value to register A |
| CP (SIGN3) | Compare with previous value |
| JP Z, EQU | If equal, return |
| LD (SIGN3), A | Change value of SIGN3 to value of SIGN2 |
| LD A, 01H | Change in sign, load flag value |
| LD FLAG, A | Change in sign, load FLAG with 1 |
| RET | |
| EQU: | |
| LD A, OH | No change in sign, |

| CMPSG23: | |
|---|---|
| | load flag value |
| LD FLAG, A | |
| RET | |

The value at memory location FLAG now indicates whether there has been a change in the sign of the amplitude difference.

The TMS320-10 would perform this logic in 8 instruction cycles, corresponding to 1.6 microseconds.

Figure 6:
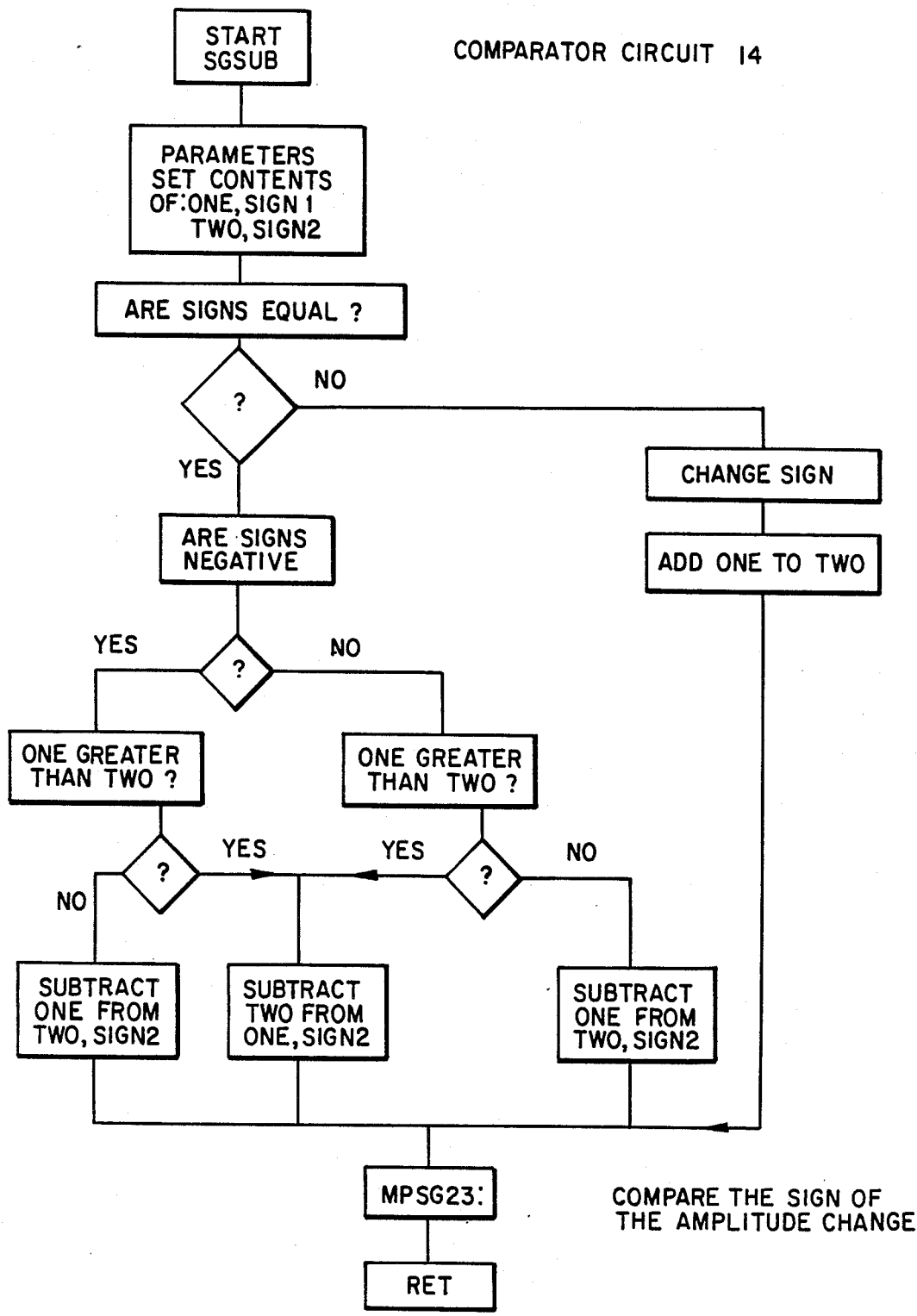
FIG. 6 is a flowchart of the operation of the comparator portion of the transmission apparatus of FIG. 1.

The flow chart of the signed substraction is depicted in FIG. 6.

The parallel channels each have a comparator 14 (routine SGSUB:) of their own. In the above example, the three parallel channels store their comparators' output at the following memory locations:

For channel one: TWO(1), FLAG(1).
For channel two: TWO(2), FLAG(2).
For channel three: TWO(3), FLAG(3).

Rewriting the routine in TMS320-10 language preserving the same logic would take 48 instruction cycles, corresponding to 9.6 microseconds.

It should be noted that when sending the first order of change, bits are conserved, and that many more are conserved when sending higher orders of change. Higher orders of change are evaluated by repeated use of the routine SGSUB:, treating the nth order of difference as input to the routine, and obtaining as an output from the same routine the (n+1)th order of difference. Still with reference to the example of the three channels, it should be noted that at the end of the transmitted example, when all the processing time of the transmitter has been evaluated, there is sufficient time to evaluate and send the fourth order of change, since the processing time of the SGSUB: is 9.6 microseconds. Therefore the receiver can process all the channels in parallel mode. This means that the inverse routine in the receiver SGNADD: to the routine SGSUB: would be multiplied, and each channel would be processed independently in order to save time, and would be able to reconstruct the real amplitude from the last order of change that was sent.

Circuit 18 is responsible for determining the classification in which the amplitude difference of all the channels is sent. The term classification refers to the number of bits per absolute amplitude change that are to be sent, since it is not necessary to send the entire byte. Determination of the classification is done in several stages. First, the output of all the parallel channels is stored in a table. One table, called LIST1, is for the absolute amplitude differences, and a second table, LIST2, is reserved for the sign changes. Thus LIST1 contains all the output TWO's values, and LIST2 contains all the output FLAG's values. In the above example, there are three channels, therefore LIST1 would contain TWO(1), TWO(2), and TWO(3), and LIST2 would contain FLAG(1), FLAG(2), and FLAG(3). The maximum value is selected from table LIST1. This result will eventually become the classification. The gathering of the parallel outputs of circuitries 14 into one table (LIST1) is done by a routine called PARAM: (see Reference 3, chapter 2, pp. 92, 93).

| PARAM: | |
|---|---|
| LD HL, LIST1 | Load address of |
| | table LIST 1 |
| LD A, TWO(1) | Load value of TWO(1) into Register A |
| LD (HL), A | Load TWO(1) in the table |
| RET | |

This routine is called three times in the above example, with the result that values TWO(1), TWO(2) and TWO(3) are stored in table LIST1.

Rewriting the routine in TMS320-10 language, while preserving the same logic, would take 6 instruction cycles, but 18 cycles would actually be used since the routine is called three times, corresponding to 3.6 microseconds.

The maximum value in table LIST1 is located by a routine called GTMAX: (see reference 4, chapter 11, page 167).

| GTMAX: | |
|---|---|
| LD IX, LIST1 | Set up list address |
| LD C, −1 | Store terminator |
| LD B, OH | Initialized greatest value |
| NEXT: | |
| LD A, (IX) | Get next entry |
| CP C | Compare to −1 |
| JR Z, DONE | Go if at end of list |
| INC IX | Point to next number |
| CP B | Compare newmax to MAX |
| JP NC, NEXT | Go if newman < = MAX |
| LD B, A | Newmax to max |
| JP NEXT | |
| DONE: | |
| LD (MAX), B | |
| RET | |

Rewriting the routine in TMS320-10 language preserving the same logic would necessitate 17 instruction cycles, corresponding to 2.4 microseconds.

The maximum value is stored at memory location called MAX. It is now possible to find the classification, that is, to find the least level, or the smallest number of bits that is sufficient in order to described the (MAX) value. The classification may have predefined levels. It is necessary to determine which levels (MAX) falls between, by a routine designed to check for a value within a limits called LMTCHK: (see Reference 3, chapter 2, pp. 105, 106).

In the above example, the classification levels are: 4 for the first level (2 bits to describe the ABS amplitude change of each of the channels); 8 for the second level (3 bits to describe the ABS amplitude change for each of the channels); and 32 for the third level (5 bits to describe the ABS amplitude change for each of the channels). There are 256 amplitude levels.

The data byte to be tested must be in the accumulator when the subroutine is called. The parameters are passed usig the PARAM: routine.

| PARAM: | |
|---|---|
| LD HL, MAX | Load address value |
| LD A, (HL) | Load value sorted in memory max to Register |
| RET | |

If the first level is relevant for describing the ABS amplitude change, the memory location called CLASSIFICATION is loaded with the value)1H. If the second level is relevant, (CLASSIFICATION) is loaded with the value 02H, and if the third level is relevant, (CLASSIFICATION) is loaded with the value 01H. For any level above the third, (CLASSIFICATION) is loaded with the value 04H. The code for the routine follows:

| LMTCHK: | |
|---|---|
| CP 04H | Compare with first level |
| LD B, 01H | If first level is relevant |
| LD (CLASSIFICATION),1 | Else return |
| RET C | |
| CP 08H | Compare with second level |
| LD B, 02H | |
| LD (CLASSIFICATION),B | Load memory with second level index |
| RET C | |
| CP 20H | Compare third level to (32) |
| LD B, 03H | If relevant |
| LD (CLASSIFICATION),B | Load to memory |
| RET | |
| LD B, 04H | All 7 bits (128 levels) used |
| LD (CLASSIFICATION),B | |
| RET | |

Rewriting the routine TMS320-10 language preserving the same logic would necessitate 27 instruction cycles, corresponding to 5.4 microseconds.

The following table summarizes and exemplifies what has been done till now. Note that i=1,2,3 (for the three channels in our example)
T=Sampling time, T−DT=Previous sampling time.

The following table may be used to determine the (GROUP) and the (CLASSIFICATION):

| GROUP | DESCRIPTION |
|---|---|
| I = 1 | No sign change in any of the three channels |
| II = 2 | Sign change in first channel only |
| III = 3 | Sign change in second channel only |
| IV = 4 | Sign change in third channel only |
| V = 5 | Sign change in more than one channel |

| CLASSIFICATION | DESCRIPTION |
|---|---|
| A = 1 | Amplitude change can be described by 2 bits per channel |
| B = 2 | Amplitude change can be described by 3 bits per channel |
| C = 3 | Amplitude change can be described by 5 bits per channel |

The stream of bits that would be sent out of circuitry 21 would be: 01111 00001 00011 1101

In the above example, the first four bits are sent as the FORMAT, then the following five are contributed by the first channel. The next group of five bits are contributed by the second channel, and the last group of five are contributed by the third channel. In the event that changes occur in the ABS amplitude sign in more than one channel simultaneously, two additional bits would be necessary for a complete description of the format. This would happen very rarely, in the above example, when the value of (GROUP) is equal to 5. If, after decoding the value of (GROUP), it is found to be 5, two more bits are to be expected, which are a continuation of the (FORMAT) and can appear at the end of the data or immediately after the (FORMAT). This depends on how much processing time is available. In the vent that time is very short in the receiver unit, for example, the entire stream of bits entering the receiver can be stored and then analyzed to determine the ABS amplitude changes of the various channels. But if there is sufficient time to process the (FORMAT) and decide whether two or more bits are exposed for a complete description of the (FORMAT), then the two more bits can follow immediately after the (FORMAT), or can come at the end of the data bits streamd. The extra two bits, should

| Channel No. | Amplitude at T-DT | Amplitude at T | ABS Amplitude at T (ONE(i, T)) | Sign of ABS amplitude at (SIGN1(i, T)) |
|---|---|---|---|---|
| 1 | 11111100 | 11111111 | 01111111 | 10000000 |
| 2 | 00000111 | 00001000 | 00001000 | 00000000 |
| 3 | 00000001 | 00010000 | 00010000 | 00000000 |

| Channel No. | ABS Amplitude at T-DT ((TWO(i, T-DT)) | Sign of Amplitude at T-DT (SIGN2(i, T-DT)) | ABS Amplitude Change at T ((TWO(i,T)) | Sign of ABS Amplitude change at T SIGN2(i) |
|---|---|---|---|---|
| 1 | 01111100 | 10000000 | 00000011 | 00000000 |
| 2 | 00000111 | 00000000 | 00000001 | 00000000 |
| 3 | 00000001 | 00000000 | 00001111 | 00000000 |

| Channel No. | SIGN3(i, T-DT) | FLAG(i,T) | SIGN3(i,T) | (MAX) |
|---|---|---|---|---|
| 1 | 00000000 | 00000000 | 00000000 | |
| 2 | 10000000 | 10000000 | 00000000 | |
| 3 | 00000000 | 00000000 | 00000000 | 00001111 |

| Channel No. | CLASSIFICATION | BITS SENT | GROUP | FORMAT |
|---|---|---|---|---|
| 1 | 3 (5 bits | ...00011 | | .....1101 |
| 2 | 3 per | ...00001 | (sign | 13 (place in |
| 3 | 3 channel) | ...01111 | change in 2) | table) | they appear, would be decoded by the following table:

| GROUP | DESCRIPTION |
|---|---|
| V = 5 | Sign change in more than one channel |
| SUBGROUP | |
| S = 0 | Change in all three channels |
| S = 1 | No change in the first channel only |
| S = 2 | No change in the second channel only |
| S = 3 | No change in the third channel only |

In the above example, this case is not described.

According to the above, 19 bits are sent instead of 24 (8×3), for the three channels. This means that in this particular case, 5 bits out of 24 are saved. In the above example, only FLAG(2) indicates a change in sign, which fact was fnoted by storing the data at memory location GROUP: (GROUP)=3.

```
                GROUP:
CMPFLG   OH,              Compare to determine
         FLAG(1)          equality
JP       NZ, L1           If not equal, jump
CMPFLG   OH,              Compare to determine
         FLAG(2)          equality
JP       NZ, L2           If not equal, jump
CMPFLG   OH,              Compare to determine
         FLAG(3)          equality
JP       NZ, L3           If not equal, jump
LD       A, 01H           No change in any
                          channel
LD       (GROUP), A       Value stored at GROUP
RET
L1:
CMPFLG   OH,              Compare to determine
         FLAG(2)          equality
JP       NZ, N2           If not equal, jump
LD       A, 02H
LD       (GROUP), A       Change in first channel only
RET
L2:
CMPFLG   OH,              Compare to determine equality
         FLAG(3)
JP       NZ, N2           If not equal, jump
LD       A, 03
LD       (GROUP), A       Change in second channel only
RET
L3:
CMPFLG   OH,              Compare to determine equality
         FLAG(3)
JP       NZ, N2           If not equal, jump
LD       A, 04H
LD       (GROUP) A        Change in third channel only
ET
N2:
LD       A, 05H           Change in more than one channel
LD       (GROUP), A
RET
CMPFLG:
MACRO    VAL1,            Macro for comparing VAL1, VAL2
         VAL2
LD       A, VAL1          If equal, Z flag equals 0.
LD       B, VAL2
AND      A,B
```

```
                GROUP:
RETM
```

Rewriting the routine in TMS320-10 language preserving the same logic would take 25 instruction cycles, corresponding to 5.0 microseconds.

Circuitry 16 is responsible for evaluating the FORMAT. The FORMAT, in the above example, consists of the four bit header preceding the data that contains the information of the sign change of each channel, and the number of bits used to express each ABS amplitude change. The FORMAT is evaluated by the following formula:

$$FORMAT = 5 \times (CLASSIFICATION - 1) + (GROUP)$$

In the above example, the value stored at memory address CLASSIFICATION is 3, and that at memory (GROUP) is also 3. Plugging into the above equation gives:

$$FORMAT = 5 \times (3-1) + 3 = 13$$

This result is confirmed by the table in FIG. 3 (where the horizontal axis is GROUP and the vertical axis is CLASSIFICATION). The routine for evaluating the FORMAT according to the above formula is given below:

```
FORMAT:  LD    A, (CLASSIFICATION)
         DEC   01H                    The (CLASSIFICATION) - 1
         ADD   A                      Multiply by 2
         ADD   A                      Multiply by 4
         LD    A, (CLASSIFICATION)    Multiply by 5
         ADD   A
         LD    B,(GROUP)              Load the GROUP value
         ADD   A                      Value of the format
         LD    (FORMAT),A
         RET
```

Rewriting the routine in TMS320-10 language preserving the same logic would take 11 instruction cycles, corresponding to 2.20 microseconds.

Circuitry 20 stores the ABS amplitude change that was inputted from circuit 14 as 8 bits per channel in a buffer. The buffer is rearranged (see circuitry 21 in FIG. 4) in such a way that the first byte in the buffer is the (FORMAT), to enable the receiver to analyze the following bits stream. The (FORMAT) in the above example is transmitted as 4 bits, so that the port outputs the (FORMAT) byte, stored as the first byte in the buffer, as 4 bits only, the LSB (least significance bit). Then the port outputs the second byte, although not all the bits of the byte, but rather only the (CLASSIFICATION) number of bits.

The routine for rearranging the buffer in circuitry 21 is called REBUFFER;, and the location in memory is called BUFFER.

```
REBUFFER:  LD    HL,         Load memory address
                 FORMAT
           LD    A, (HL)
           LD    IX,         Load buffer address
                 BUFFER
           LD    IX, (A)     FORMAT value in buffer
           INC   IX          Next place in buffer
```

-continued

| | | |
|---|---|---|
| LD | HL, TWO(1) | Load memory address |
| LD | A,(HL) | ABS amplitude at Register A |
| LD | (IX),A | First channel stored |
| INC | IX | Next place in buffer |
| LD | HL, TWO(2) | Load memory address |
| LD | A, (HL) | ABS amplitude at Register A |
| LD | (IX), A | Second channel stored |
| INC | IX | Next place in buffer |
| LD | HL, TWO(3) | Load memory address |
| LD | A, (HL) | ABS amplitude at Register A |
| LD | (IX), A | Third channel stored |
| RET | | |

Rewriting the routine in TMS320-10 language, preserving the same logic, would take 18 instruction cycles, corresponding to 3.6 microseconds.

The routine for outputting the stream of bits out of circuitry 21 is named IN OUT: and may be found in Reference 3, Chapter 4, page 154 (flowchart on page 155). Since no information is stored in AF, HL, and IX Registers, a flag indicating that port is in progress would be superfluous, since the port is not being shared. The number of channels is stored in address memory BFRCNT (three, in the above example). Eliminating unnecessary code, the routine becomes:

| | | |
|---|---|---|
| INTOUT: | LD HL, BFRCNT | Set buffer to data counter |
| | DE (HL) | Decrement the data counter |
| | JP Z, STCNTR | If zero, load counter again |
| | LD IX,(FLGOUT + 1) | Fetch buffer pointer into index Register |
| | INC IX | Advance output buffer pointer |
| | LD A, (IX + 00H) | Fetch character to be outputted from buffer |
| | LD (FLGOUT + 1),IX | Restore updated buffer pointer to memory |
| | OUT 02H, A | Output the character to device |
| | JP IN OUT | Transmit all buffer |
| STCNTR: | LD HL, BFRCNT | Set address |
| | LD (HL), 03H | Three channels in above example |
| | RESULT | |

Figure 7:
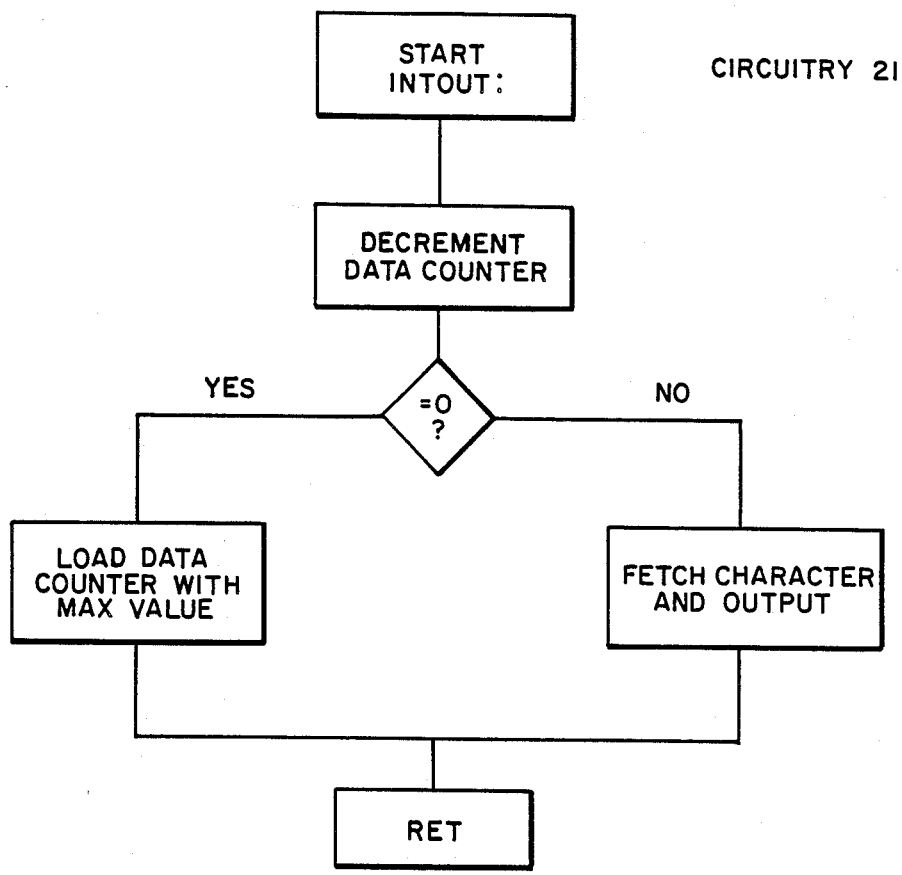
FIG. 7 is a flowchart of the operation of the multiplexer of ig. 4.

The flow chart appears in FIG. 7.

The total time needed to process all the subroutines is:
25.0+2.0+2.0+2.2+1.6+9.6+3.6+2.4+5.4+5.0+2-.2+3.6=64.6 microseconds.

This leaves 125−64.d6=60.4 free microseconds, more than is necessary for the addition of a header byte for a frame to construct a packet. Such frames are not dealt with here, but recommendations from any standard protocol may be followed.

Reference is now made to FIG. 2, which is a block diagram of the receiving circuitry. First, the frame is removed. Although frames as such are not dealt with here, one possibility of saving bits is nonetheless pointed out. Once the frame has been removed, the stream of data which remains is composed of the header or the (FORMAT), that is, the first four bits. To decode the information sorted in the first four bits, use is made of the DECODE: table, which is stored in the memory of the receiver. However, the stream of the first four bits must first be inputted. This is done by use of the same routine as was used in the transmitter, INTINP1:. This routine stores the input at the memory location pointed at by a pointer called FLG IN+1. Its processing time using the TMS320-10 chip is 2.0 microseconds. The construction of the DECODE: table proceeds as follows:

| DECODE | |
|---|---|
| DB 02H | Two bits per channel |
| DB 01H | No sign change in any of the three channels |
| DB 02H | Two bits per channel |
| DB 02H | Sign change in the first pf the three channels |
| DB 02H | Two bits per channel |
| DB 03H | Sign change in the second of the three channels |
| DB 02H | Two bits per channel |
| DB 04H | Sign change in the third of the threee channels |
| DB 02H | Two bits per channel |
| DB 05H | Sign change in more than one channel |
| DB 03H | Three bits per channel |
| DB 01H | No sign change in any of the three channels |
| DB 03H | Two bits per channel |
| DB 02H | Sign change in the first of the three channels |

And so on, the length of the DECODE: table in the above example being 32 (the format is between 1–16, and each number is split into two: the value of the (CLASSIFICATION), and the value of the (GROUP)). In the above example, the value of the format that was transmitted was 13. Therefore, table DECODE:, at the 26th location from its beginning, contains the information that the value of the (CLASSIFICATION) is 3, and the value of (GROUP) is 3. To pass the parameters, the PARAM: routine is used (see reference 3, chapter 2, page 93). The value of the (FORMAT), after it was inputted to circuitry f30, is stored at address memory location FLGIN+1; the offset in the DECODE: table corresponding to twice this value must now be found.

| PARAM: | |
|---|---|
| LD IX,(FLGIN+1) | Load format value |
| ADD IX, IX | Multiply by two |
| LD DE, DECODE | Load DECODE address |
| ADD IX, DE | |
| Offset in table DECODE: | |
| LD A, (ix) | Value of CLASSIFICATION |
| LD (CLASSIFICATION),A | |
| INC IX | Next place in the table |
| LD A,(ix) | Load with (GROUP) value |
| LD (GROUP),A | |
| RET | |

Rewriting the routine in TMS320-10 language preserving the same logic would take 11 instruction cycles, which corresponds to 2.2 microseconds.

At this stage, the value of the (CLASSIFICATION) determines the number of bits that the port will input at one time. Each inputted number of (CLASSIFICATION) of bits correspond to one channel, and is stored at circuitry 32 memory as a byte. The bytes corresponding to all the channels are stored one after the other in the memory of circuitry 32. These values are the ABS amplitude changes of the channels. For each such byte, the correct sign must be defined. The value of (GROUP) will indicate whether there was a change of sign with respect to the previous sign, i.e., that value which is stored at memory location (SIGN3(i,T-DT)). At power on, the memory location SIGN3 is loaded with zero. To get the real signs of the ABS amplitude change, a search is first conducted for the FLAG(i,T), then (SIGN1) is evaluated, by use of a routine called SIGNS:.

| SIGNS: | |
|---|---|
| LD A, (GROUP) | Load Register A with value of GROUP |
| CP 01H | If equal, there is not change of sign in any of the channels |
| JP Z, NOCHN | |
| CP 02H | If equal, change of sign in channel one only |
| JP Z, CHN1 | |
| CP 03H | If equal, change of sign in channel three only |
| JP Z, CHN3 | |
| CP 05H | If equal, change of sign in more than one channel |
| JP A, CHN4 | |
| RET | |
| NOCHN: | |
| LDF A, (SIGN3(1)) | The previous sign |
| LD (SIGNl(1)),A | SIGN1 for ABS amplitude change, channel 1 |
| LD A,(SIGN3(2)) | Load previous sign |
| LD (SIGN1(2)),A | SIGN1 for ABS amplitude change, channel 2 |
| LD A, (SIGN3(3)) | Load previous sign |
| LD (SIGN1(3)),A | SIGN1 for ABS amplitude change, channel 3 |
| RET | |
| CHN1: | |
| LD A, (SIGN3(2)) | The previous sign |
| LD (SIGN1(2)), A | SIGN1 for ABS amplitude change, channel 2 |
| LD A, (SIGN3(3)) | Load previous sign |
| LD (SIGN1(3)),A | SIGN1 for ABS amplitude change, channel 3 |
| LD A, (SIGN3(1)) | Load complement 2's |
| CA A | |
| LD (SIGNl(1)), A | The sign |
| RET | |
| CHN2: | |
| LD A, (SIGN3(1)) | The previous sign |
| LD (SIGN1(1)),A | SIGN1 for ABS amplitude change, channel 2 |
| LD A, (SIGN3(3)) | Load previous sign |
| LD (SIGN1(3)),A | SIGN1 for ABS amplitude change, channel 3 |
| LD A, (SIGN3(2)) | Load complement 2's |
| CA A | |
| LD (SIGN1(2)),A | The sign |
| RET | |
| CHN3: | |
| LD A, (SIGN3(1)) | The previous sign |
| LD (SIGN1(1)),A | SIGN1 for ABS amplitude change, channel 2 |
| LD A, (SIGN3(2)) | Load previous sign |
| LD (SIGN1(2)),A | SIGN1 for ABS amplitude change, channel 3 |
| LD A, (SIGN3(3)) | Load complement 2's |
| CA A | |
| LD (SIGN1(3)),A | The sign |
| RESULT | |

This routine may be called to change the signs of all the channels, which would take the maximal processing time. Rewriting the routine in TMS320-10 language, preserving the same logic, would, for maximal processing, take 31 instruction cycles, corresponding to 6.2 microseconds.

Once the ABS amplitude change for each of the channels has been determined, and the real sign of this change is available, it is possible to calculate the real amplitude per channel. The ABS amplitude change at time T is stored at the memory location called ONE, and its sign is stored at the memory location called SIGN1. The ABS amplitude at the previous sampling point T-DT (and not the ABS amplitude change) is stored at memory location TWO, and its sign is stored at memory location SIGN2. At power up, the values at memory locations TWO and SIGN2 are set to zero. In other words, the first time the amplitude is sampled, the entire amplitude is treated as the amplitude difference. Therefore, reconstruction of the real amplitude is done by sign addition of the current difference and of the previous amplitude stored at memory location TWO and SIGN2. The real amplitude is reconstructed by a routine called SGNADD: (see reference 3, chapter 7, pages 212-214). This signed additional routine, beginning at the label SGNADD:, adds the content of table ONE to table TWO and returns with the answer in Table TWO. The calling routine simply loads tables ONE, SIGN1, table TWO, and SIGN2 with the desired values. The values of the SIGN1(i) were already loaded by the routine SIGNS. The following routine is now used:

| PARAM: | |
|---|---|
| LD IX,(FLGIN + 1) | Load address |
| INC IX | Location of ABS amplitude change |
| LD (ONE(1)),(IX) | Load ABS amplitude change for channel 1 |
| INC IX | Location of ABS amplitude change |
| LD (ONE(2)),(IX) | Load ABS amplitude change for channel 2 |
| INC IX | Location of ABS amplitude change |
| LD (ONE(3)),(IX) | Load ABS amplitude change for channel 3 |
| RET | |

Once the values ONE(1) and SIGN(i) have been loaded, a routine that calculates the real amplitude for one channel can be called. This procedure must be repeated three times, once for each channel, unless the channels work in parallel. Since, in the above example, there are only three channels, the evaluation of the routines for all channels, one channel after the other, can be effected in serial logic with a sampling rate of 8 KHz, whereas this would not be possible if there were more than three channels.

Circuitry 34 is operative to store the current amplitude for each channel, which is done as follows:

| | | |
|---|---|---|
| SGNADD: | LD HL, SIGN1 | Set pointer to sign of one number |
| | LD A, (SIGN2) | Fetch sign of second number |
| | CP (HL) | Compare signs |
| | JP Z, SAR2 | If equal, add numbers and exit |
| | JP C, SAR3 | ONE is negative, TWO is positive |
| SAR1: | CALL CMPR12 | Is ONE greater than TWO? |
| | JP C, SB12 | If not, substract ONE from TWO |
| | XOR A | Else, clear the accumulator |
| | LD (SIGN2),A | Change SIGN2 to indicative positive |
| | JP SB21 | Substract TWO from ONE |
| SB12: | CALL SHIFT | Shift ONE to TWO, TWO to SHIFT |
| | LD HL,SHIFT | Set up pointer for substracting |
| | LD DE,TWO | Original ONE from TWO |
| | LD BC, 0001H | Set byte counter |
| | CALL DECSUB | Subtract ONE from TWO |
| | RET | Return to calling program |
| SAR2: | LD HL,TWO | Set up pointer for addition |
| | LD DE,ONE | Of ONE to TWO |
| | LD BC, 001H | Set byte counter |
| | CALL DECADD | Add ONE to TWO |
| | RET | Return to calling routine |
| SAR3: | CALL CMPR12 | Is ONE greater than TWO? |
| | JP C, SB12 | If not, substract ONE from TWO |
| | LD, A, 80H | If so, change SIGN2 |
| | LD (SIGN2),A | to negative |
| SB21: | LD HL,ONE | Set up pointers to subtract |
| | LD DE,TWO | TWO from ONE |
| | LD BC, 0001H | Set byte counter |
| | CALL DECSUB | Subtract TWO from ONE |
| | RET | Return to calling program |
| CMPR12: | LD HL,TWOM | Set pointers to the largest bytes |
| | LD DE,ONEM | of ONE and TWO |
| | LD BC,0001H | Set byte counter |
| CMPR: | LD A,(DE) | Fetch byte from table |
| | CP (HL) | Compare to byte in other table |
| | RET NZ | If not equal, return with flags |
| | DEC DE | Else, decrement pointer to TWO |
| | CPD | as well as pointer to ONE & to counter |
| | JP PE, CMPR | If counter not zero, continue |
| | RET | Else exit to calling routine |
| SHIFT: | LD HL,TWOM | Set up "from" pointer |
| | LD DE, SHIFT | Set up "to" pointer |
| | LD BC, 0002H | Set up byte counter |
| MOVLOP: | LD A, (HL) | Fetch "from" byte |
| | LD (DE), A | Move it to new location |
| | DEC DE | Decrement "to" pointer |
| | CPD | Decrement "from" pointer and counter |
| | JP PE,MOVLOP | If counter not zero, continue |
| | RET | Else, exit to calling routine |

Figure 8:
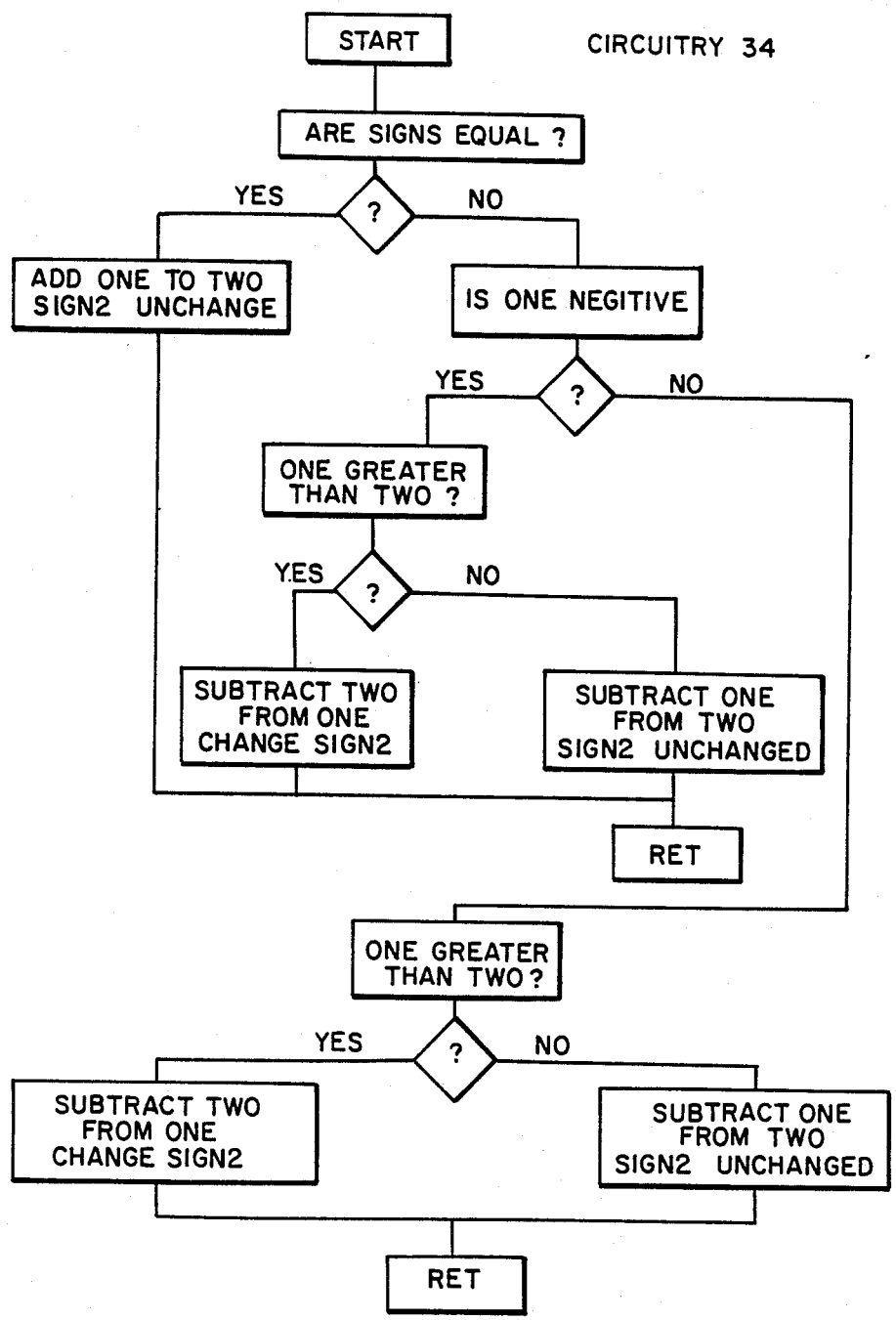
FIG. 8 is a flowchart of the operation of the memory portion of the receiving apparatus of FIG. 2.

The flow chart for the signed addition routine is depicted in FIG. 8. The answer is in table TWO, SIGN2, which is already prepared for the inputting, since this result must be sign added to the future amplitude change.

Rewriting the routine in TMS320-10 language, preserving the same logic would use a maximal processing time of 19.2 microseconds, corresponding to 96 instruction cycles (32 instruction cycles×3 channels in the above example).

As a result of having called this subroutine three times, the ABS amplitudes of the three channels are stored at locations TWO(1), TWO(2) and TWO(3), and the signs of the channels are stored as SIGN2(1), SIGN2(2) and SIGN2(3). The two bytes must now be consolidated into one byte. That is, the SIGN2 must now become the MSB of the result, and the 7 LSB will become the value of TWO. This is done by ORing the two bytes. For example, the routine for channel 1 is:

| | | |
|---|---|---|
| COIN: | LD A, TWO(1) | Load ABS amplitude to Register A |
| | LD B, (SIGN2(1)) | Load the sign |
| | OR B | Make one byte out of the two |

-continued

| | |
|---|---|
| LD (FLGOUT + 1),A | Load result in proper place |
| RESULT | for the outputting routine |

Rewriting the routine in TMS320-10 language, preserving the same logic, would necessitate 6 instruction cycles for each of the three channels in the above example, or a total of 18 instruction cycles, corresponding to 3.6 microseconds of processing time.

The outputs from all the channels are stored one after the others starting at the memory location pointed at by the pointer FLGOUT+1. Those bytes are inputted to an A/D converter (circuitry 36). An A/D well known in the art. The specification of this A/D is:
Resolution: 12 bits
Setting time: 0.25 microseconds.

In the above example, the 8 MSB of the resolution may be used. Since this D/A is inputted three times (once for each channel), the processing time will be 0.75 microseconds.

The total time needed to process all the subroutines is 2.0+2.2+6.2+19.2+3.6+0.75=33.95 microseconds.

This leaves us with 125−34=91 microseconds, more than is needed to add a header byte for a frame as recommended by any protocol (frames are not dealt with in this paper). If it is desired to process the fourth order of change, it is still possible to remain in serial mode (i.e., to maintain a separate microprocessor for each channel).

The processing time of routine SGNADD: for one order of change for all three channels is 19.2 microseconds. Adding three more orders of change to create the fourth order of change would mean calling SGNADD three more times which would take an additional 57.6 microseconds (19.2×3=57.6), which is still feasible. On the other hand, if it is desired to send any higher order of change, the receiver will require a processor for each of the channels, so as to process separately for each, those routines connected with that channel's logic.

IV. Intermediate Sample Extrapolation and Transmission of Corrections To Extrapolated Samples Reference is now made to FIG. 9 which illustrates in general block diagram form a communications system constructed and operative in accordance with an embodiment of the present invention.

Figure 9A:
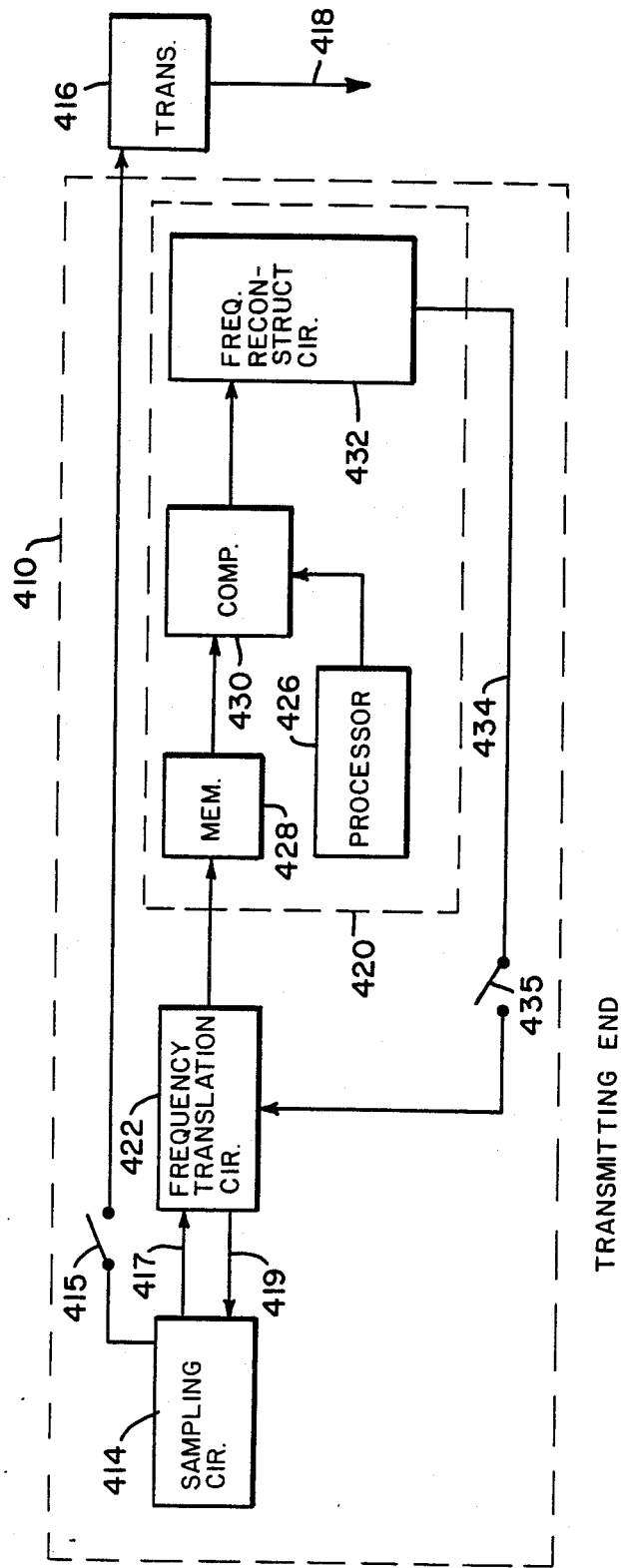
FIGS. 9A and 9B are block diagram illustrations of a communications system constructed and operative in accordance with an embodiment of the present invention.
Figure 9B:
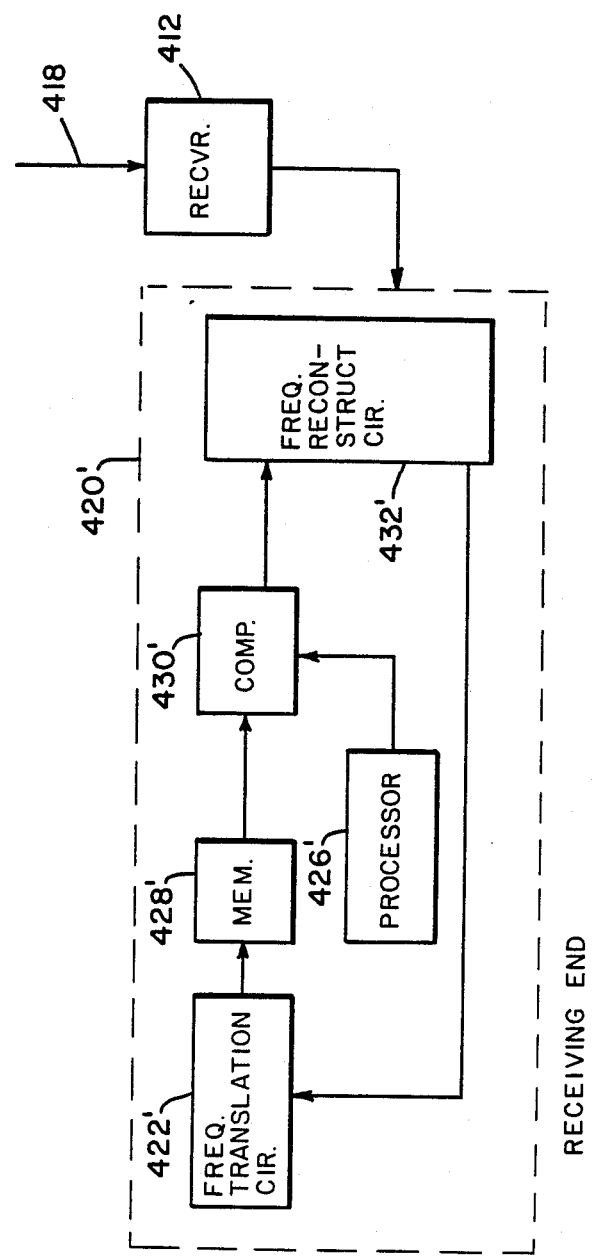

The communications system of FIGS. 9A and 9B comprises transmitting and 410 and receiving end 412. Transmitting end 410 comprises a sampling circuit 414 including an A/D converter for sampling a signal which provides a first digital output representing every (n+1)th sample, where n is a predetermined integer, typically 5 or 10, via a switch 415 to a transmitter 416 which transmits such samples over a conventional trunk 418 to receiving end 412. Sampling circuit 414 also provides a second digital output 417 of every sample to correction circuit 420. The correction circuit 420 provides correction data on output 419 through sampling circuit 414 to transmitter 416. The corrections data is transmitted between the (n+1)th samples transmitted by sampling circuit 414. Preferably, the corrections are transmitted with a predetermined periodicity with respect to the (n+1)th samples.

In accordance with one embodiment of the present invention, the correction circuit 420 calculates order changes, e.g. derivatives, of the signal sampled by the sampling 414 and is represented as a first digital output at switch 415. For example, the zeroth order change is defined as Do which is the original sampled values of the signal amplitude. The 1st order change of the sampled signal is the difference between the amplitude values at two sampling points Y and Y+1. The nth order change at a sampling point Y is equal to the value of the previous order changed $D_{n-1}$ at the sampling point Y+1 minus the value of the previous order change $D_{n-1}$ at the sampling point Y. This can be expressed as follows:

$$D_n(Y) = D_{n-1}(Y+1) - D_{n-1}(Y)$$

where Dn=order change and Y=sampling point. In a more general case, the value of the previous order change $D_{n-1}$ at the sampling point Y can be equal to the value of a predetermined reference function.

At this point, reference is made to tables of FIGS. 12A and 12B. FIG. 12A shows the values of the first through ninth derivative of twenty sample points of a sinusoidal signal of frequency 250 Hz, a selected component voice signal. As an example, a first derivative of the AMP value in row 1 equals 24.0 which is the difference between Do(1)=49 and Do(2)=25.

The table of FIG. 12B illustrates the first through eight derivatives the same signal extrapolated at the receiver assuming that the 9th order derivative equals zero. The values AMP of first ten sampling points are the same values of the values AMP of FIG. 2A and the last ten values AMP below the line represent extrapolated values of the signal amplitude AMP obtained by the technique described hereinbelow.

In both of FIGS. 12A and 12B, the entries lying above the lines are based on actual received data, while those lying below the line in FIG. 12B represent extrapolations. By assuming that the 9th derivative is zero, an error on only about 1% is introduced in the 9th extrapolation (AMP (19)) of FIG. 12B as compared with AMP (19) of FIG. 12A. That is, the extrapolated value of the amplitude is −72, instead of −71, out of the maximum sampled amplitude value of 128, e.g., $2^8$.

As shown in FIG. 12B, the technique of building the extrapolated value of $D_{n-1}$ of an signal corresponding to the AMP sampled point Y+1 is performed by adding the value of two terms representing the values of the nth order change at a sampling point Y, $D_n(Y)$ to the value of the (n−1)th order change at the same sampling point Y, $D_{n-1}(Y)$. This can be expressed as follows:

$$D_{n-1}(Y+1) = D_n(Y) + D_{n-1}(Y)$$

In a more general case, the value of Dn(Y) can be a predetermined reference function. As shown in FIG. 12B, the value of Do(15) is equal to 25 equals the sum of D1(14)=−24 and Do(14)=49.

As noted earlier in connection with application of the above technique to cases where the sampled signal has a high frequency component, the present invention also provides a technique and apparatus which permits transmissions of high frequency signals.

Referring again to FIG. 9A, correction circuit translating circuit 422, for downconverting the high-frequency components of an input signal to plural low-frequency bands. In this fashion, a broader frequency spectrum, say zero to 4 Khz voice low-frequency bands. Plural low-frequency output channels from translating circuit 422 are supplied in parallel typically up to 250 Hz, to amplitude sensing circuitry 424, typically comprising a microprocessor 426, associated memory 428 and comparator means 430. Circuitry 424 provides the following functions:

(a) stores in memory 428 of the zero through nth order change in the signal amplitude AMP at periodic sample points of the waveform. The memory 428 is updated at each (n+1)th sample.

(b) Assumes that the (n+1)th derivative of each sample is zero (not essential)

(c) Extrapolates the next amplitude AMP from the zero through nth derivatives of the previous samples.

(d) Compares the extrapolated values AMP with the actual signal value AMP at such sample received over line 417 from the sampling circuit 414.

(e) Provides a correction to the intermediate samples as required. This correction is transmitted to the receiver 412 via transmitter 416 and trunk 418, and is also applied for updating the memory 428. Receiver 412 includes the same correction circuit 420 for performing its own extrapolation.

The microprocessor 426 and associated circuitry can implement the sampling, storage and correction process by well known techniques, such as by use of a TI type TMS 320-10-20-25C microprocessor. This microprocessor is described in the publication entitled TMS 32020 USER'S GUIDE, Digital Signal Processor Products, Texas Instruments 1985.

The output of amplitude sensing circuitry 424 is a parallel digital output and is supplied to frequency reconstruction circuitry 423, which reconstructs the composite voice spectrum from the plural 250 Hz bands of low-frequency components of the voice spectrum.

In practice a portion of this signal output from frequency reconstruction circuit 432 is supplied via feedback connection 434 to the input to frequency translation circuit 422 through switch 435 for providing repeating inputs to circuitry 422 and 424, to enable them to provide successively extrapolated samples. The switch 435 is opened prior to receipt of each (n+1)th sample, to permit extrapolation of that sample. The operation of switch 435 is coordinated with the operation of switch 415, such that switch 415 is closed only when switch 435 is opened, and when corrections are being transmitted from circuitry 420 via output 419 and sampling circuitry 414.

The corrections are generated in circuit 420 by comparison of the (n+1)th sample obtained from sampling circuit 414 with the extrapolated value of the (n+1)th sample which has been reconverted and is available from frequency reconstruction circuit 432.

The frequency reconstructed signal output contains the original (n+1)th samples which had been downconverted to lower frequency bands and then reconverted after the extrapolation. In addition, the extrapolated values of AMP first created in the low frequency domain are converted by the frequency reconstruction circuit 432 to the frequency of the signal being sampled by sampling means 414.

Generally, the function of circuitry 420 may be understood to be cyclical in that it begins with the (n+2)th sample and then extrapolates, the (n+3)th, (n+4)th through the nth sample sequentially.

Receiver 412 comprises circuitry essentially identical to circuitry 420, which is operative to receive along the trunk 418, the (n+1)th samples as well as correction outputs and to provide at the output of frequency reconstruction circuitry 432 a composite frequency sampled output including the received (n+1)th samples and the remaining samples extrapolated therefrom.

It may thus be appreciated that high quality signal transmission is achieved with very considerable bit savings due to the fact that only every (n+1)th sample is transmitted aside for corrections when needed. New initial conditions are provided by every (n+1)th sample. Alternatively instead of transmitting the entire (n+1)th sample, only the necessary correction may be transmitted.

It is noted that the memories 428 of both the transmitter and receiver are identical and are maintained in the same state currently, such that the transmitter always is aware of the errors that are accumulating in the receiver and can correct them as appropriate.

V. Frequency Translation Circuit 422

The operation of all mixers described herein combines one high-frequency of speech component with another high-frequency signal. The outputs of the mixers are a first signal having a frequency equal to the difference between the two frequencies and a second signal having a frequency equal to the sum of the two frequencies based on the following relationship:

$$2 \cos (f_m \cdot J + \psi_m) \cdot a_k \cdot \cos (f_k \cdot J + \psi_k) = a_k (\cos [(f_k + f_m)J + \psi_k + \psi_m]) + \cos [(f_k - f_m)J + \psi_k - \psi_m])$$

where $J = 2\pi n/8000$, and $\cos (\{-(f_m * J + \psi_m)\}) = \cos \{(f_m * J + \psi_m)\}$ and n, m, and k are integers.

The purpose of the mixing is to downconvert high-frequency components of sampled speech information to lower frequency bands so that the extrapolation can be performed without aliasing. If one digitally samples a signal having a frequency f1 at a sampling rate of F, the sampled result is equivalent to sampling of a signal of frequency f2 at the same sampling rate, if $f_1 = F \pm f_2$. For example, if the sampling rate F equals 8 kHz, and f1 equals 7 kHz, the sampled required is equivalent to the sampling of a 1 kHz signal at an 8 kHz sampling rate. The result from an extrapolation point of view is that extrapolation from a 1 kHz signal with an 8 kHz sampling rate is like predicting the next sampled value of a 7 kHz signal at an 8 kHz sampling rate.

Accordingly by downconverting the entire voice spectrum to plural low-frequency bands of, say, 250 Hz each, and sampling those low-frequency bands at the 8 KHz rate, one can obtain information about the high-frequency components.

This is demonstrated by the following expression:

$$J = 2\pi n/F$$

$$\cos \{f2 * J + \psi\} =$$

$$\cos [(F +/- f1) * J + \psi] = \cos[2\pi n +/- 2\pi n f1/F + \psi] =$$

$$\cos [+/- 2\pi f1 n/F + \psi] = \cos [+/- f1 * J + \psi]$$

where F is the sampling rate at the transmitter, here taken to be 8000 Hz, and f is the frequency of the signal being sampled.

Thus, if the signal frequency f1 approaches the sampling rate F, the difference signal frequency produced by the mixer has a frequency equal to the difference between these two frequencies, a desired low frequency. If the frequency of this difference signal is not sufficiently low, the difference signal may be mixed once again with a reference signal of suitable frequency so as to provide the desired frequency output.

It is also appreciated that the mixer provides a sum signal having a frequency equal to the sum of the two multiplied frequencies. This frequency increases at each mixing stage until it approaches the sampling rate sufficiently so as to be equivalent to a desired low frequency signal.

The mixers of the frequency translation circuit 422 and inverse mixers associated with frequency reconstruction circuitry 432 are digital mixers, rather than conventional analog mixers, and can be implemented by ROM look-up tables. The look-up tables contain digited values of pure sine and cosine functions of particular frequencies. These sine and cosine functions approximate respective components or 250 Hz bands, in the speech signal. Thus, the mixing and frequency reconstruction becomes a simple multiplication procedure which closely estimates the real speech signal.

Selection of the reference signal frequencies of the various mixers is achieved in accordance with the following equations:

$f = F/2i$ where $i = 1, 2$, etc.

Bandwidth $f_i \pm \Delta f$ where fi is the central bandwidth frequency $\Delta f$ is half of the bandwidth frequency.

Since most of the information in voice transmissions is found in the 0-750 Hz range, the 0-750 Hz, the $f_i$ and $f_2$ outputs of filter 438 contain most of the speech information and therefore all of the remaining outputs representing the higher frequency speech components, which eventually reduce to 0-250 Hz bands, may be reconstructed with low bit content, i.e., assuming that the nth order change therein equals zero, without significantly affecting signal quality, provided that n is selected to be sufficiently large.

Figure 10A:
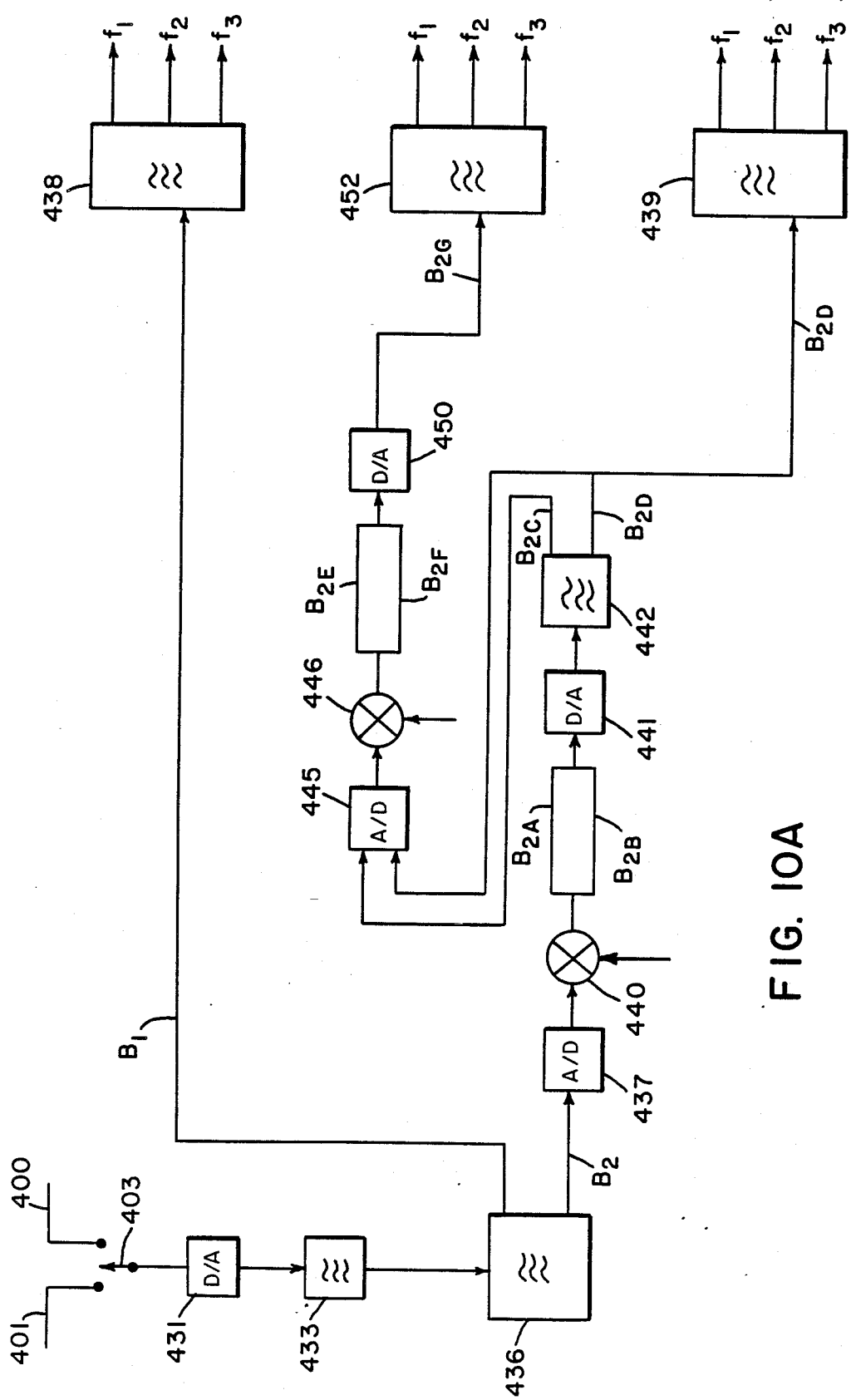
FIGS. 10A and 10B are block diagram illustrations of frequency translation circuitry associated with respective transmission and receiving portions of the communications system constructed and operative in accordance with a preferred embodiment of the present invention and illustrated generally in FIGS. 9A and 9B.
Figure 10B:
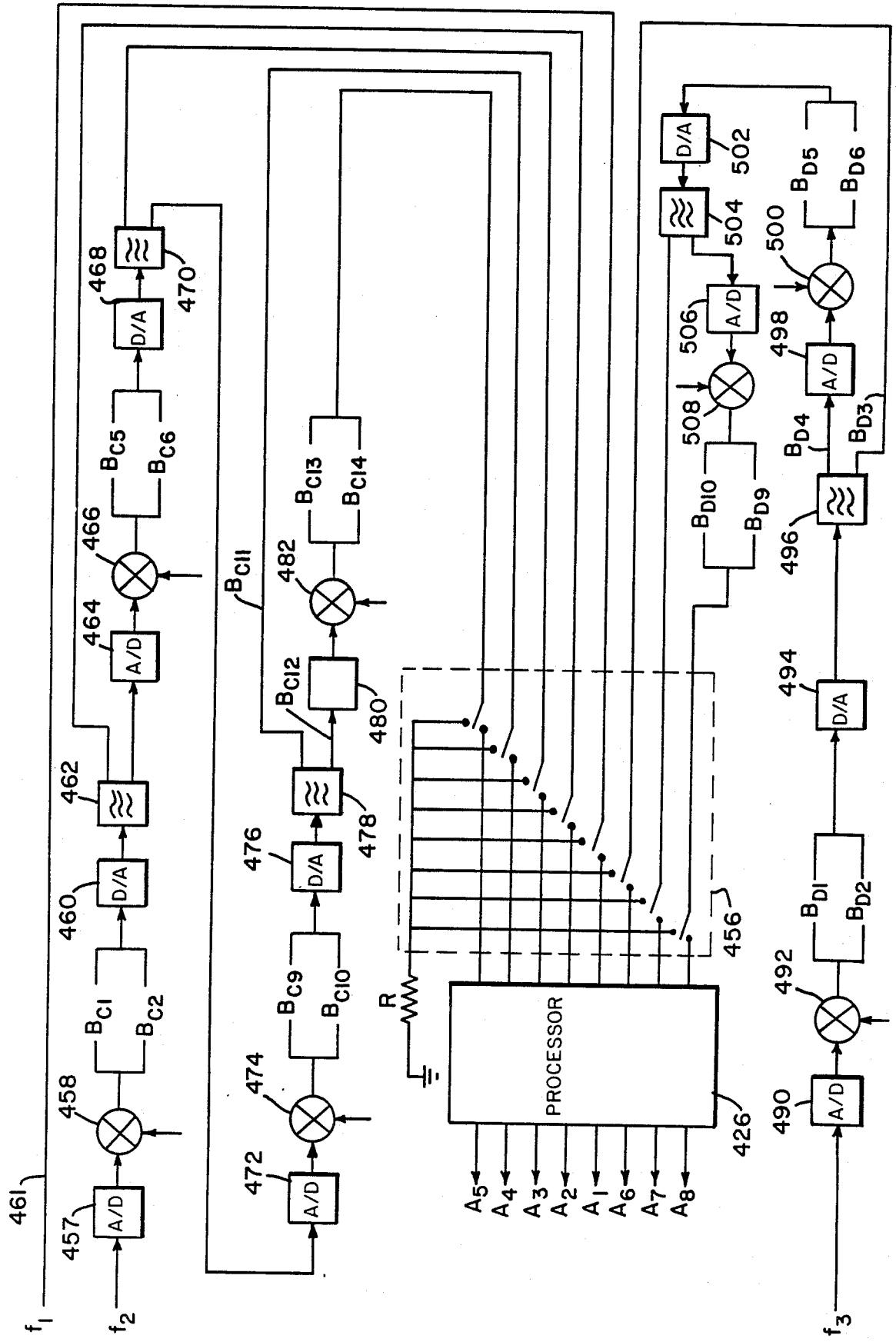

Reference is now made to FIGS. 10A and 10B which illustrate the components of frequency translation circuit 422 associated with the transmitting 410 (FIG. 9A). The frequency translation circuit 422 comprises an input terminal 400 connected with switches 415 and 435 (FIG. 10A) for passing digital inputs to D/A converter 431. The analog output of the D/A converter 431 is filtered by bandpass filter 433 and then by a first stage filter 436 which provides two analog outputs of different frequency bands $B_1$ and $B_2$ where $B_1$ spans, about 0 Hz to 1000 Hz and $B_2$ spans 1000 Hz to 3000 Hz. $B_1$ carries the low-frequency components of speech while $B_2$ carries the high-frequency components of speech.

Band $B_1$ is filtered by a second stage filter 438 which divides the band $B_1$ into three bands $f_1$, $f_2$ and $f_3$, respectively spanning 0-250 Hz, 250-500 Hz, and 750-1000 Hz.

High-frequency band $B_2$ is supplied to an A/D converter 437 and thence to a digital mixer 440 where it is multiplied by a digital representation of $\cos(2000\,J+\psi)$, where $J = (2\pi/8000)n$ and n is a positive non-zero integer. The divisor "8000" is the sampling frequency. Mixer 440 provides two output bands $B_{2A}$ and $B_{2B}$ respectively spanning $-1000$ to 1000 Hz and 3000-5000 Hz. The output of mixer 440 is supplied via a D/A converter 441 to an intermediate stage filter 442 where it is separated into two output bands $B_{2C}$ and $B_{2D}$, first having a frequency range of approximately 3000-5000 Hz and the other having a frequency range of approximately 0-1000 Hz.

Band $B_{2D}$ is supplied to a second stage filterbank 439 which divides the band into three bands $f_1$, $f_2$, $f_3$ having 0-250 Hz, 250-750 Hz, and 750-1000 Hz spectrums.

Band $B_{2C}$ is supplied via an A/D converter 445 to a digital mixer 446 where it is combined with digital representation of the function $2\cos(4000\,J+\psi)$. The output of the mixer 446 comprises two band components $B_{2E}$ and $B_{2F}$ having $-1000$ to 0 Hz and a 7000-9000 Hz spectrums, which are supplied to a D/A converter 450, produces, as will be described hereinafter, an analog signal having a band $B_{2G}$ of approximately 0-1000 Hz. Band $B_{2G}$ is supplied to a second stage filter 452 which divides the band into three bands $f_1$, $f_2$, $f_3$ having frequency ranges, 0-250 Hz, 250-750 Hz, and 750-1000 Hz.

Referring to FIG. 10B, $f_1$ outputs of filters 438, 439 and 452, all having a frequency band of approximately 0-250 Hz, are separately supplied to signal path 461 for further processing. The $f_2$ outputs of filters 438, 439 and 452, all having a frequency band of approximately 250-750 Hz, are separately supplied via an A/D converter 457 to a digital mixer 458 which digitally multiplies the $f_2$ signals by a digital representation of the function $2\cos(500\,J+\psi)$ signal. The output of mixer 458 includes two bands $B_{C1}$ and $B_{C2}$ of $+250$-250 Hz and a 750-1250 Hz. $B_{C1}$ and $B_{C2}$ are supplied via a D/A converter 460 to analog filter 462 which separates the signal into a band $B_{C3}$ spanning 250 Hz to $+250$ Hz. $B_{C3}$ is supplied directly to switch circuitry 456. The other $B_{C4}$ from filter 462 spans 750-1250 Hz and is supplied via an A/D converter 464 to a digital mixer 466 which digitally multiplies $B_{C4}$ by a digital representation of the function $2\cos(1000\,J+\psi)$ producing an output which includes band $B_{C5}$ of $-250+250$ Hz and band $B_{C6}$ of 1750 to 2250 Hz. This output is supplied via an D/A converter 468 and to analog filter 470. $B_{C7}$ is supplied directly to switch circuitry 456. The other output $B_{C8}$ spanning 1750 Hz to 2250 Hz is supplied via an A/D converter 472 to a digital mixer 474. Switch circuitry 456 is terminated in one switch position by grounded resistor R.

Mixer 474 digitally multiplies $B_{C8}$ by a digital representation of the function $2\cos(2000\,J+\psi)$, producing $B_{C9}$ spanning $-250$ to $+250$ Hz and $B_{C10}$ spanning 3750-4250 Hz. $B_{C9}$ and $B_{C10}$ are supplied via a D/A converter 476 to analog filter 478, which produces $B_{C11}$ spanning $-250$ to $+250$ Hz which is supplied directly to switch circuitry 456. The other output $B_{C12}$ which spans 3750 to 4250 Hz is supplied via an A/D converter 480 to a digital mixer 482.

Mixer 482 digitally multiplies $B_{C12}$ by a digital representation of the function $2\cos(4000\,J+\psi)$, producing $B_{C13}$ spanning a $-250$ to $+250$ Hz and $B_{C14}$ spanning 7750-8250 Hz, the combination of which is equivalent to a $-250$ to $+250$ Hz band and a 7750 to 8250 Hz band which is equivalent to a $-250$ to $+250$ Hz band as explained hereinabove. $B_{C14}$ is supplied directly to switch circuitry 456.

The $f_3$ outputs of filters 438, 439 and 452, having a band of approximately 750-1000 Hz, are supplied via an A/D converter 490 to a digital mixer 492, via filters 438, 452 and 439 (FIG. 10A.

Mixer 492 digitally multiplies the $f_3$ signals by a digital representation of the function $2\cos(1000\,J+\psi)$, producing $B_{D1}$ spanning a 250 to 0 Hz and $B_{D2}$ spanning 1750 to 2000 Hz. This output is supplied via a D/A converter 494 to a filter 496, which separates the bands into $B_{D3}$ of $-250$ Hz to $+250$ Hz, which is supplied directly to switch circuitry 456, and 1750 to 2000 Hz which is supplied via an A/D converter 498 to a digital mixer 500. Mixer 500 digitally multiplies the $B_{D4}$ by a digital representation of $2\cos(2000\,J+\psi)$, producing $B_{D6}$ of $-250$ Hz to 0 Hz and 3750 to 4000 Hz. This output is supplied via a D/A converter 502 to a filter 504, which separates the bands into $B_{D7}$ of $-250$ to $+250$ Hz which is supplied directly to switch circuitry 456 and $B_{D8}$ of 3750 to 4000 Hz which is supplied via an A/D converter 506 to a mixer 508.

Mixer 508 multiplies $B_{D8}$ by a digital representation of $2\cos(4000\,J+\psi)$, producing an output which includes $B_{D9}$ of $-250$ to 0 Hz and a $B_{D10}$ of 7750-8250 Hz. As noted above, this band is equivalent to the $-250$ to 0 Hz band and is supplied directly to switch circuitry 456.

VI. Frequency Reconstruction Circuit 432

Figure 11A:
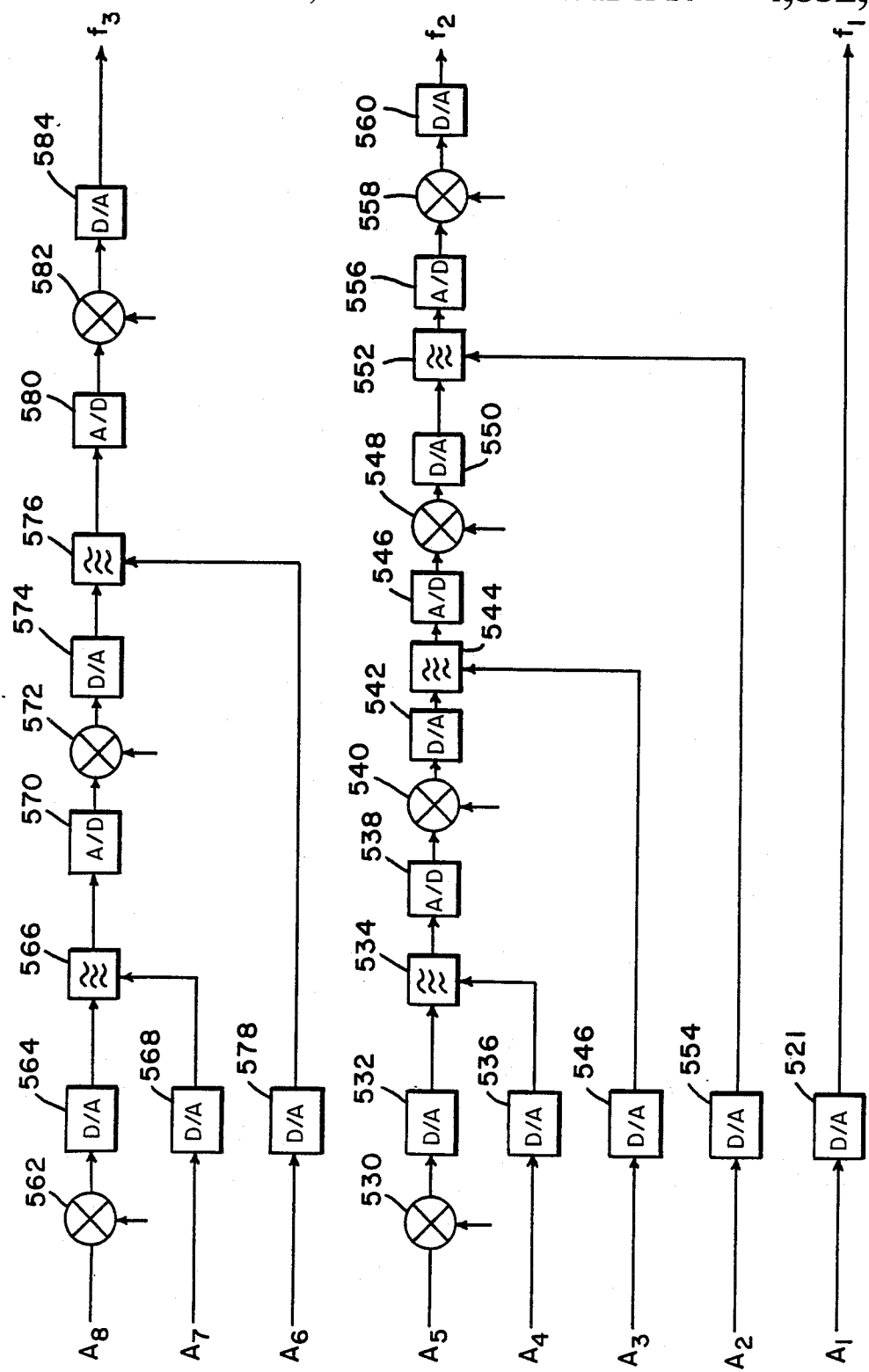

Reference is now made to FIG. 11A which is a block diagram illustration of frequency reconstruction circuitry 432 (FIG. 9A) associated with the receiving portion of the communications system.

Frequency reconstruction circuit receiving eight components $A_1$ through $A_8$ of the speech signed from microprocessor 426 (FIG. 10A) and outputs these components $f_1$, $f_2$ and $f_3$. Component $A_1$, having a 0 to 250 Hz band is supplied via a D/A converter 521 directly to the $f_1$ input of each of the three combining circuits (inverse filterbank) 524, 526, and 528 of FIG. 11B. The $-250$ to $+250$ Hz component $A_5$ is supplied to a divider circuit (inverse mixer) 530 which divides $A_5$ by a representation of 2 cos (4000 J+$\psi$) and provides an output via a D/A converter 532 to a combining circuit (inverse filter) 534, which also receives, via a D/A converter 536, component $A_4$, which also has a bandwidth of $-250$ to $+250$ Hz. The output of circuit 534 is supplied via an A/D converter 538 to a divider circuit 540 (inverse mixer) and provides an output via a D/A converter 542 to a combining circuit (inverse filter) 544, which also receives, via a D/A converter 546, component $A_3$, which also has a bandwidth of $-250$ to $+250$ Hz.

The output of circuit 544 is supplied via an A/D converter 546 to a divider circuit (inverse mixer) 548 which divides the signal component by a representation of the function 2 cos (1000 J+$\psi$) and provides an output via a D/A converter 550 to a combining circit (inverse filter) 552, which also receives via a D/A converter 554, component $A_2$, which also has a bandwidth of $-250$ to $+250$ Hz. The output of circuit 552 is supplied via an A/D converter 556 to a divider circuit (inverse mixer) 558 which divides the signal component by a representation of the function 2 cos (500 J+$\psi$) and provides an output via a D/A converter 560 which constitutes the $f_2$ to inverse filters (combining circuits) 524, 526, and 528 (FIG. 11B).

The $-250$ to 0 Hz band component $A_8$ (FIG. 11A) is supplied to a divider circuit (inverse mixer) 562 which divides $A_8$ by a digital representation of the function 2 cos (4000 J+$\psi$) and provides an output via a D/A converter 564 to a combining circuit (inverse filter) 566, which also receives, via a D/A converter 568, component $A_7$, which also has a bandwidth of $-250$ to 0 Hz. The output of circuit 566 is supplied via an A/D converter 570 to a divider circuit (inverse mixer) 572 which divides the signal component by a digital representation of the function 2 cos (2000 J+$\psi$) and provides an output via a D/A converter 574 to a combining circuit (inverse filter) 576, which also receives, via a D/A converter 578 component $A_6$, which also has a bandwidth of $-250$ to 0 Hz.

The output of circuit 576 is supplied via an A/D converter 580 to a divider circuit (inverse mixer) 582 which divides the signal component by a digital representation of the function 2 cos (1000 J+$\psi$) and provides an output via a D/A converter 584. This output constitutes the $f_3$ inputs to inverse filters (combining circuits) 524, 526, and 528 (FIG. 11B).

Referring to FIG. 11B, the outputs of inverse filter 526 is supplied via an A/D converter 527 to a divider circuit (inverse mixer) 590 which divides the signal component by a 2 cos (4000 J+$\psi$) signal and provides an output via a D/A converter 591 to an inverse filter 592 which also receives the output from inverse filter 528.

The output of inverse filter 592 is supplied via an A/D converter 593 to a divider circuit (inverse mixer) 594 which divides the signal component by a digital representation of the function 2 cos (2000 J+$\psi$) and provides an output via a D/A converter 595 to an inverse filter 596 which also receives the output from inverse filter 524.

The output of inverse filter 596 is supplied via switch 435 (FIG. 9A) to provide the necessary feedback via D/A converter 431 (FIG. 10A).

It is noted that instead of the analog filters described hereinabove, digital filters may be used thus eliminating the need for D/A conversion means. If, however, analog filters are used, they contain an additional A/D converter to provide digital output for the computer 426.

It will be appreciated by persons skilled in the art that the present invention is not limited to what has been particularly shown and described hereinabove. A completely digital implementation is practical which uses digital filters, digital mixing, and does not require extensive use of A/D and D/A converters. Rather, the scope of the present invention is defined only by the claims which follow.

I claim:

1. An improved bit saving system for use in a data communications system which transfers digital representations of an information signal of a given frequency spectrum from a transmitter to a receiver wherein the transmitter and receiver includes means to generate corresponding data series representing the information signal based upon periodic real data samples thereof, intermediate extrapolated values thereof, and correction values, wherein the transmitter includes:

i. sampling means (414) for periodically sampling said information signal thereby to generate real data samples, ii. transmission means (415) for enabling the transmission of selected ones of said real data samples, and iii. correction means (420) for generating and enabling the transmission of said correction values, said correction values representing the difference between extrapolated and real data samples, and wherein the receiver includes:

iv. correction means (420') responsive to transmitted correction values for correcting intermediate extrapolated data samples produced thereat in order to generate said corresponding data series, the improvement wherein the transmitter and receiver each include:

A. frequency band translation means (422) comprising:

i. means for subdividing the frequency spectrum of the information signal represented by the data series into plural sub-bands, and ii. means for frequency-translating selected ones of said sub-bands above a predetermined lower frequency band to sub-bands of said predetermined lower frequency thereby to enable extrapolation using discrete samples thereof without aliasing, and B. extrapolation means (426) for producing said extrapolated values from said plural sub-bands, said extrapolation means comprising:

i. derivative computation means for determining plural order derivatives of each of said low-frequency sub-bands, ii. zero order derivative determination means for computing the value of the low-frequency signal of each said sub-bands based upon the respective computed plural order derivatives from said computation means, and C. reconstruction means (432) for combining said low-frequency sub-bands from said determination means in order to reconstruct a composite representing said extrapolated sample thereby to enable the transmitter to determine the correction value and the receiver to correct the extrapolated value.

2. An improved bit saving system as recited in claim 1 wherein said transmission means includes means for transmitting every nth real data sample, where n is an integer, and said correction means enables the transmission of correction values between transmission of every nth real data sample.

3. An improved bit saving system as recited in claim 2 wherein said correction means enables the transmission of correction values with respect to said nth real data sample.

4. An improved bit saving system as recited in claim 1 wherein said frequency band translation means subdivides the spectrum of said information signal into plural bands of equal bandwidth and frequency-translates selected ones of said bands above said predetermined lower frequency band to an equal low-frequency band.

5. An improved bit saving system as recited in claim 4 wherein the information signal is human speech data, and said plural sub-bands have a width of approximately 250 to 500 Hz and a center-frequency of approximately 125 to 250 Hz.

6. An improved bit saving system as recited in claim 1 wherein said frequency band translation means comprises means for converting an analog representation of the information signal to digital form and means for performing the frequency-translation by digital techniques utilizing digital mixers.

7. An improved bit saving system as recited in claim 1 wherein said frequency band translation means comprises means for performing the frequency-translation by analog mixers.

8. An improved bit saving system as recited in claim 1 wherein said transmission means enables transmission of correction values on an as needed basis depending upon the magnitude of correction values.

9. An improved bit saving system as recited in claim 1 wherein said transmitter and receiver include memory means for maintaining real data samples, extrapolated data samples, and plural order derivatives thereof, and further including means to update said memory means according to said correction values.

* * * * *